(12) United States Patent
Lee

(10) Patent No.: US 12,744,234 B2
(45) Date of Patent: Sep. 22, 2026

(54) SECONDARY BATTERY ELECTRODE FILM AND SEPARATOR SUPPLY DEVICE

(71) Applicant: Kye-Seol Lee, Seoul (KR)

(72) Inventor: Kye-Seol Lee, Seoul (KR)

( * ) Notice: Subject to any disclaimer, the term of this patent is extended or adjusted under 35 U.S.C. 154(b) by 763 days.

(21) Appl. No.: 18/137,483

(22) Filed: Apr. 21, 2023

(65) Prior Publication Data

US 2024/0322213 A1 Sep. 26, 2024

(30) Foreign Application Priority Data

Mar. 22, 2023 (KR) ........................ 10-2023-0037001
Mar. 22, 2023 (KR) ........................ 10-2023-0037010
Mar. 22, 2023 (KR) ........................ 10-2023-0037074

(51) Int. Cl.
*H01M 10/04* (2006.01)
*H01M 10/0587* (2010.01)
*H01M 50/46* (2021.01)

(52) U.S. Cl.
CPC .... *H01M 10/0409* (2013.01); *H01M 10/0587* (2013.01); *H01M 50/461* (2021.01); *H01M 2220/20* (2013.01)

(58) Field of Classification Search
CPC ......... H01M 10/0404; H01M 10/0409; H01M 10/0587; H01M 50/461; B65H 19/10; B65H 19/102; B65H 19/12; B65H 19/123; B65H 19/126; B65H 19/1852; B65H 19/30; B65H 19/305; B65H 2301/4173; B65H 2301/41734; B65H 2301/41818; B65H 2301/41826; B65H 2301/41828; B65H 2301/4185; B65H 2301/41856; B65H 2301/44352; B65H 2301/46075; B65H 2301/4631; B65H 2301/413226; Y10T 29/49108; Y10S 414/124
See application file for complete search history.

(56) References Cited

U.S. PATENT DOCUMENTS

| | | | | |
|---|---|---|---|---|
| 4,427,158 A * | 1/1984 | Conrad | B65H 67/0405 242/473.6 |
| 10,271,469 B2 * | 4/2019 | Tanokuchi | H05K 13/0419 |
| 2018/0284038 A1 * | 10/2018 | Shinomiya | B25J 15/0019 |
| 2023/0046747 A1 * | 2/2023 | Ikeshita | B65H 19/2223 |

FOREIGN PATENT DOCUMENTS

| | | |
|---|---|---|
| KR | 101956930 | 3/2019 |
| KR | 102425021 | 7/2022 |

* cited by examiner

*Primary Examiner* — Thomas J Hong
*Assistant Examiner* — Joshua D Anderson
(74) *Attorney, Agent, or Firm* — IPLA P.A.

(57) ABSTRACT

A secondary battery electrode film and separator supply device configured to: replace a bobbin when an electrode separator is used up by automatically extracting an empty bobbin from a spool, mounting the empty bobbin on a side of a bobbin mount of a bobbin changer, changing the position of a new bobbin mounted on another side by rotating the bobbin mount 180 degrees, and then moving and mounting the new bobbin on the spool; automatically extracting an end of a wound electrode separator through vacuum suction and connecting the end to another electrode separator; and feed a replacing material roll to a moving spool, cut a finishing tap at an end of a material by a predetermined length, and then automatically connect a new separator end of the replacing material roll and an in-use separator end through taping.

3 Claims, 24 Drawing Sheets

SECONDARY BATTERY ELECTRODE FILM AND SEPARATOR SUPPLY DEVICE

CROSS REFERENCE

The present application claims priority to Korean Patent Application Nos. 10-2023-0037001, 10-2023-0037010, and 10-2023-0037074 respectively filed on Mar. 22, 2023, with the Korean Intellectual Property Office, the entire contents of which are incorporated herein for all purposes by this reference.

BACKGROUND

The present disclosure relates to a secondary battery electrode film and separator supply device, particularly, configured to: automatically replace a bobbin when an electrode separator is used up by automatically extracting an empty bobbin from a spool, mounting the empty bobbin on a side of a bobbin mount of a bobbin changer, changing the position of a new bobbin mounted on another side by rotating the bobbin mount 180 degrees, and then moving and mounting the new bobbin on the spool; automatically extracting an end of a wound electrode separator through vacuum suction and connecting the end to another electrode separator; and feed a replacing material roll to a moving spool, cut a finishing tap at an end of a material by a predetermined length, and then automatically connect a new separator end of the replacing material roll and an in-use separator end through taping.

In general, a secondary battery for an electric vehicle is a battery that is not disposed of, but semi-permanently used through charging after it is used once, and a lithium ion battery of secondary batteries is the most generally used and has many advantages in comparison to other batteries, so a lithium ion battery is widely used as the battery of not only electronic devices, but electric vehicles.

Such a lithium ion battery is manufacture by manufacturing electrodes, that is, a cathode and an anode by applying cathode and anode active materials to a metal foil, by manufacturing a Jelly Roll by putting and winding a separator between the electrodes, by inserting the Jelly Roll into a cylindrical or polygonal container, and then by filling the container with an electrolyte and sealing the container.

In order to manufacture such a Jelly Roll, a material roll formed by winding a cathode, an anode, and a separator on a bobbin in a roll type is mounted on a spool, and then the cathode, the anode, and the separator are fed and wound on a winding roll, whereby a Jelly Roll is manufactured. When the materials wound on the material roll of the cathode, the anode, and the separator are used up, it is required to replace the material roll with another material roll.

In particular, a separator makes it difficult to increase a roll diameter for the material characteristics thereof, so it is required to frequently replace rolls in a winding process.

Accordingly, a rest time of a manufacturing facility increases due to frequent replacement of material rolls and connection of ends of the materials of material rolls in the process of manufacturing Jelly Rolls of lithium ion secondary batteries in the related art, so the productivity of lithium ion secondary batteries decreases.

Further, workers frequently meet with safety accidents in the process of replacing heavy rolls and the manufacturing quality is deteriorated due to manual replacement.

That is, since automated equipment for replacing bobbins for a separator was not proposed in the related art, workers every time manually take out and separate an empty bobbin from a shaft and then move and fit a new bobbin for a separator onto the shaft to use it.

Accordingly, since workers have to every time manually replace empty bobbins for a separator with new bobbins in the related art, there is a defect that it is difficult and also takes long time to replace bobbins.

That is, since a rest time of a manufacturing facility increases due to frequent replacement of material rolls and connection of ends of the materials of material rolls in the process of manufacturing Jelly Rolls of lithium ion secondary batteries in the related art, there is a defect that productivity of lithium ion secondary batteries is deteriorated, workers frequently meet with safety accidents in the process of replacing heavy rolls, and the quality is deteriorated due to manual replacement.

In particular, work cannot continue without disconnection unless ends of electrode separators are continuously connected when electrode separators are replaced, and workers have to every time manually extract and connect ends in order to extract ends of electrode separators in the related art, so there is a defect that it is troublesome and inconvenient to extract ends of electrode separators.

Meanwhile, various technologies for solving the problems with manufacturing facilities have been disclosed in the related art. According to these technologies, a material roll can be additionally mounted on only one spool and a worker leads and prepares material ends of a replacing material roll to a mount and prepares a connection tape at an automatic connection portion in a standby state, whereby when materials are used up, a standby material roll is automatically connected to an in-use material roll and a worker removes the bobbin of a used material roll and repeatedly prepares and uses a new material roll.

Accordingly, in the related art, it is required to prepare material rolls while alternatively using two spools and to dispose a worker for replacing materials, and in addition, it is manually made to examine and manage the consumption situation of materials and replace materials, so there is a defect that workability and productivity are deteriorated, a large amount of manufacturing cost is needed, and in addition, the manufacturing quality is deteriorated and various safety accidents are caused.

Prior Art Documents: Korean Patent Application No. 10-2021-0094953; Korean Patent No. 10-1956930; and Korean Patent Application No. 10-2021-0094953.

SUMMARY OF THE INVENTION

The present disclosure has been made in an effort to solve the defects in the related art described above and an objective of the present disclosure is to provide a secondary battery electrode film and separator supply device that can automatically replace an empty bobbin for an electrode separator with a new bobbin using a unit that rotates a bobbin mount 180 degrees at one place without a worker every time manually replacing bobbins when replacing bobbins for an electrode separator.

Another objective of the present disclosure is to provide a secondary battery electrode film and separator supply device that can automatically extract and connect an end of a wound electrode separator to another electrode separator using an up-down holder with the end of the electrode separator pulled by vacuum suction.

Another objective of the present disclosure is to provide a secondary battery electrode film and separator supply device that feeds a replacing material roll to a moving spool, cuts a material by a predetermined length by peeling off a finishing tap at the end of the material, conveys and mount the replacing material roll ahead of a main spool, and automatically connects a separator end of the replacing material roll and an in-use separator end through taping.

The present disclosure for achieving the objectives is characterized by being composed of a bobbin extractor and shifter and a bobbin changer, in which the bobbin extractor and shifter and the bobbin changer are configured on one table; the bobbin extractor and shifter includes a spool for mounting a bobbin, a bobbin shifter taking an empty bobbin, which is fitted on the spool and used up, moving within a predetermined section, receiving a new bobbin and moving, and then fitting and fixing the new bobbin on the spool, a rail installed on a bottom to move the bobbin shifter, and a support for supporting the rail; and the bobbin changer includes a bobbin mount formed in a straight cylindrical shape to mount several new bobbin on a side and mount an empty bobbin on another side, a turn table installed under the bobbin mount to rotate the bobbin mount 180 degrees, a rail for moving the turn table, and a support for supporting the rail.

The present disclosure is characterized in that, in order to automatically extract a separator end, a pair of vacuum suctioners is provided ahead of an electrode separator, a separator end is fixed up and down by an up-down holder with an adhesive sticker, which is bonded at a middle, torn and separated by pulling up both sides of the separator end using vacuum, and then next work is continuously performed, the adhesive sticker has a perforated line at the center, and other perforated lines are formed over and under the perforated line, respectively, so that the adhesive sticker is easily torn.

The present disclosure is characterized by including, in order to automatically connecting a separator end through taping: a material roll feeding unit that feeds and fits a replacing material roll having a material wound on a bobbin onto a moving spool; a material roll extracting unit that extracts a material end of the replacing material roll fed to the moving spool; a material roll cutting unit that cuts the material end of the replacing material roll by a predetermined length; a material roll shifting unit that moves the moving spool having the replacing roll mounted thereon to the front of a main spool; a material changing unit that fits and mounts the replacing roll on the moving spool onto the main spool by pushing it, and aligns a separator end of the replacing material roll with an in-use separator end; and a material roll connecting unit that connects the separator end of the replacing material roll and the in-use separator end into one piece by connecting them using a tape.

As described in detail above, the present disclosure has an effect that it is possible to automatically perform work of automatically taking out an empty bobbin fitted on a spool and moving the empty bobbin to a bobbin changer, receiving and fitting a new bobbin onto the spool on one turn table, and it is possible to replace an empty bobbin with a new bobbin by mounting the empty bobbin on a side of one bobbin mount and a new bobbin on another side and switching them using a unit for rotating them 180 degrees.

The present disclosure has an effect that it is possible to enable work to continue without disconnection by pulling an end of a separator through vacuum suction, fixing the separator end using an up-down holder, and connecting the end to another separator.

The present disclosure has an effect that it is possible to automatically perform an entire process of feeding and fitting a replacing material roll onto a spool using a material roller feeding unit, of cutting off a separator end by a predetermined length using a material roll cutting unit, of moving the replacing material roll to the front of a main spool using a material roll shifting unit, of fitting the replacing material roll onto the main spool by pushing it using a material roll changing unit such that the separator end of the replacing material roll is aligned with an in-use separator end, and of connecting the separator end of the replacing material roll and the in-use separator end by bonding them using a tape.

BRIEF DESCRIPTION OF THE DRAWINGS

FIG. 10 is a perspective view of an automatic extractor of the present disclosure.

FIG. 11 is a perspective view showing the state in which a holder is positioned at an electrode separator end of the present disclosure.

FIG. 12 is a plan view showing the positions of a separator, a suctioner, and a holder of the present disclosure.

FIG. 13 is a view showing the state in which the suctioner of the present disclosure has suctioned an end portion of a separator.

FIG. 14 is a view showing the state in which an adhesive sticker at the center has been separated by the suctioner of the present disclosure suctioning and pulling a separator.

FIG. 15 is a perspective view showing the state in which an end portion of a separator is held and fixed by an up-down holder of the present disclosure.

FIG. 16 is a view showing an adhesive sticker of the present disclosure.

FIG. 17 is a perspective view in which a separator is prepared ahead and an adhesive film is prepared behind in the present disclosure.

FIG. 18 is a front view excluding the separator and the suctioner of the present disclosure.

FIG. 19 is a front view showing operation of holding ends of a pair of left and right adhesive films by a pair of left and right holders B moving up in the present disclosure.

FIG. 20 is a front view showing the state in which a holder pulls an adhesive film by moving down and a holder A fixes the upper portion of the adhesive film in the present disclosure.

FIG. 21 is a front view showing the state in which the suctioner of the present disclosure has suctioned and held an adhesive film.

FIG. 22 is a front view showing a cutting process with the suctioner holding an adhesive film in the present disclosure.

FIG. 23 is a front view showing a moving-down state of the suctioner after cutting the adhesive film of FIG. 22.

FIG. 24 is a front view showing operation of bonding two sheets of adhesive films by left and right suctioners moving to the center in the present disclosure.

FIG. 25 is a front view showing the state in which the adhesive surface of a non-overlap portion is exposed when two sheets of adhesive films are inaccurately bonded in the present disclosure.

FIG. 26 is a front view showing operation of connecting a new separator to an end of a completely used separator of the present disclosure.

FIG. 27 is a front view of an assembly including an adhesive film and a separator suctioner of the present disclosure.

FIGS. 28 to 31 are front views when one separator connection has been finished by inaccurately bonding both surfaces of an adhesive film to a suctioner and sequentially bonding a right separator and a left separator to an exposed adhesive surface.

DETAILED DESCRIPTION OF THE INVENTION

Hereafter, embodiments of the present disclosure are described with reference to the accompanying drawings.

Figure 1:
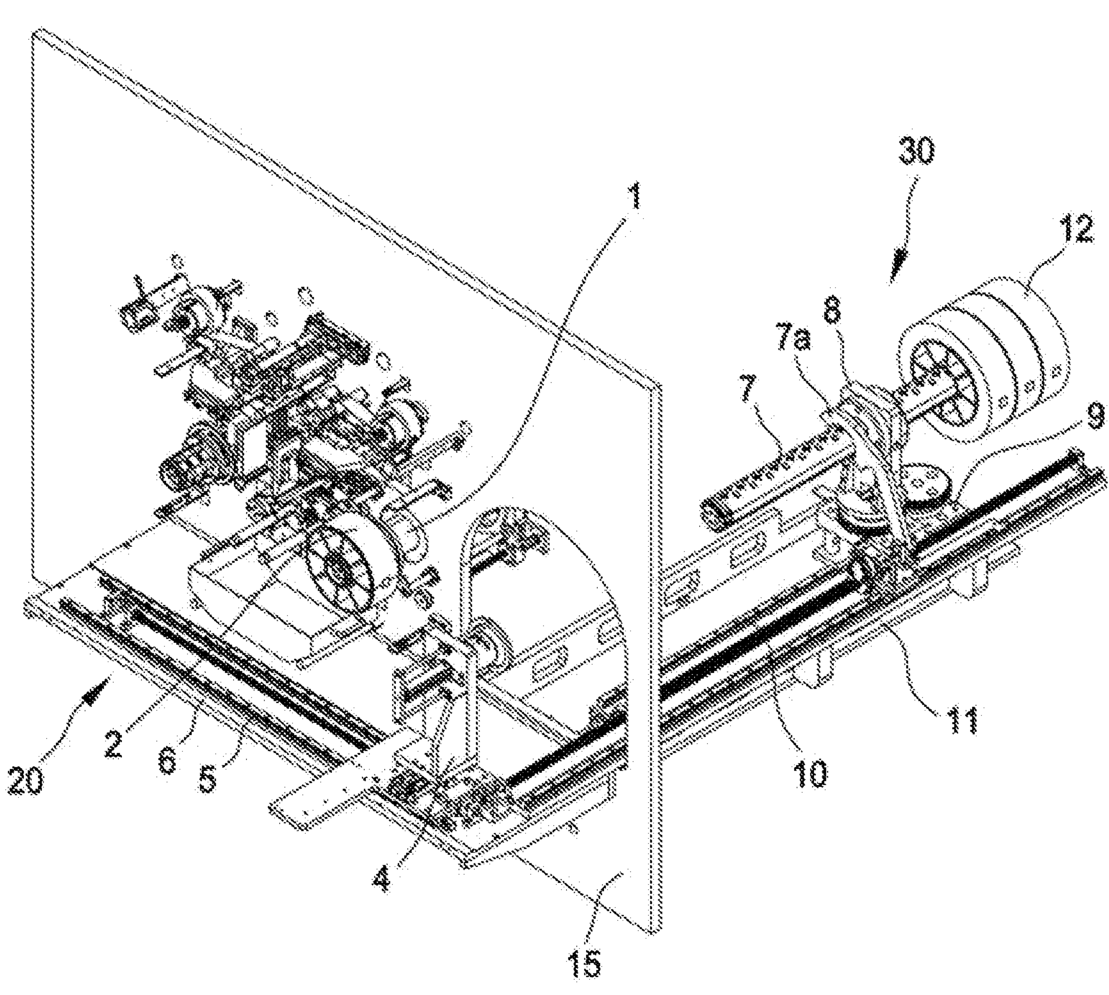
FIG. 1 is a perspective view showing the entire configuration of the present disclosure.
Figure 2:
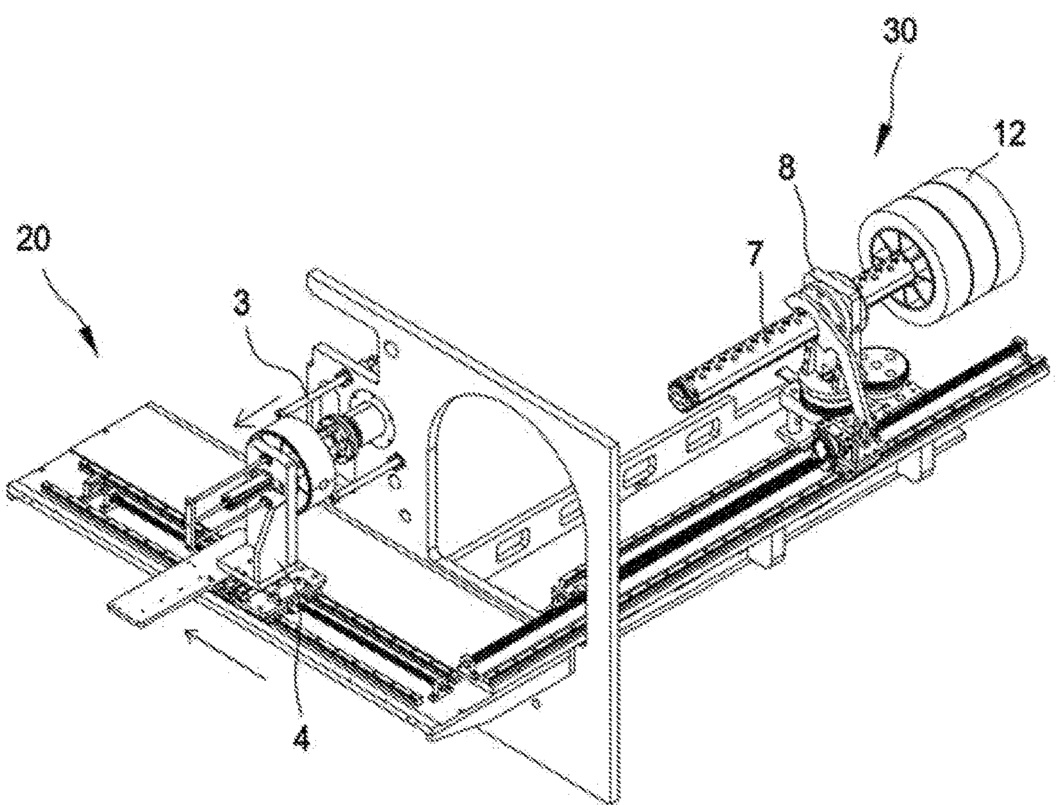
FIG. 2 is a perspective view showing operation of bobbin shifter moving to take an empty bobbin of the present disclosure.
Figure 3:
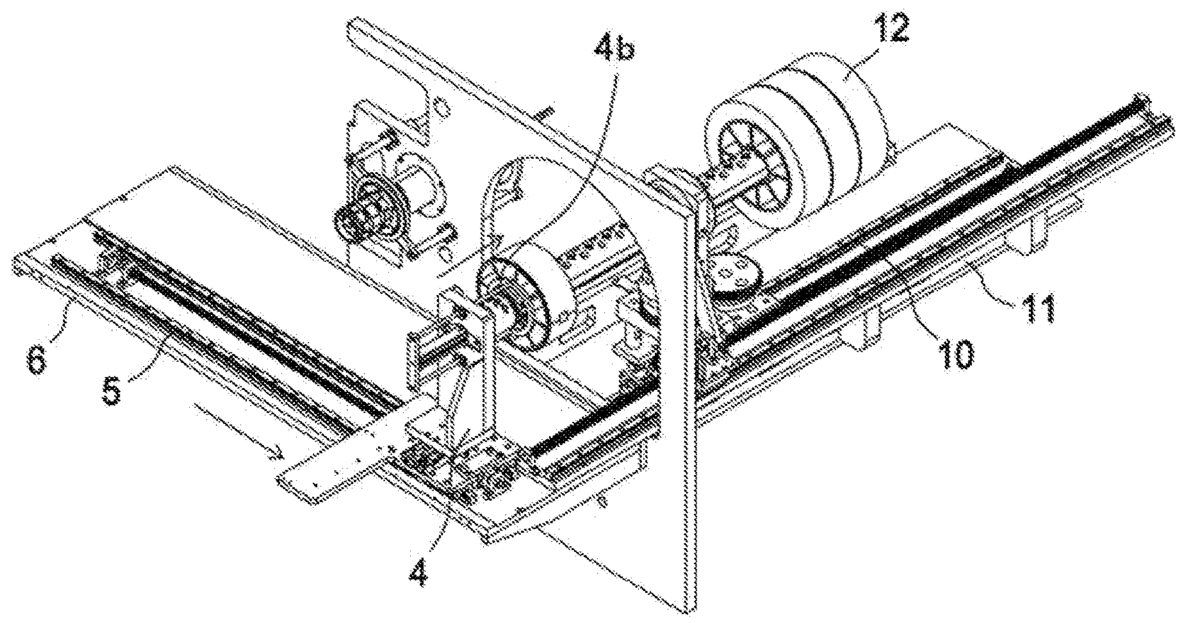
FIG. 3 is a perspective view showing operation of taking and delivering an empty bobbin of the present disclosure to a bobbin changer.
Figure 4:
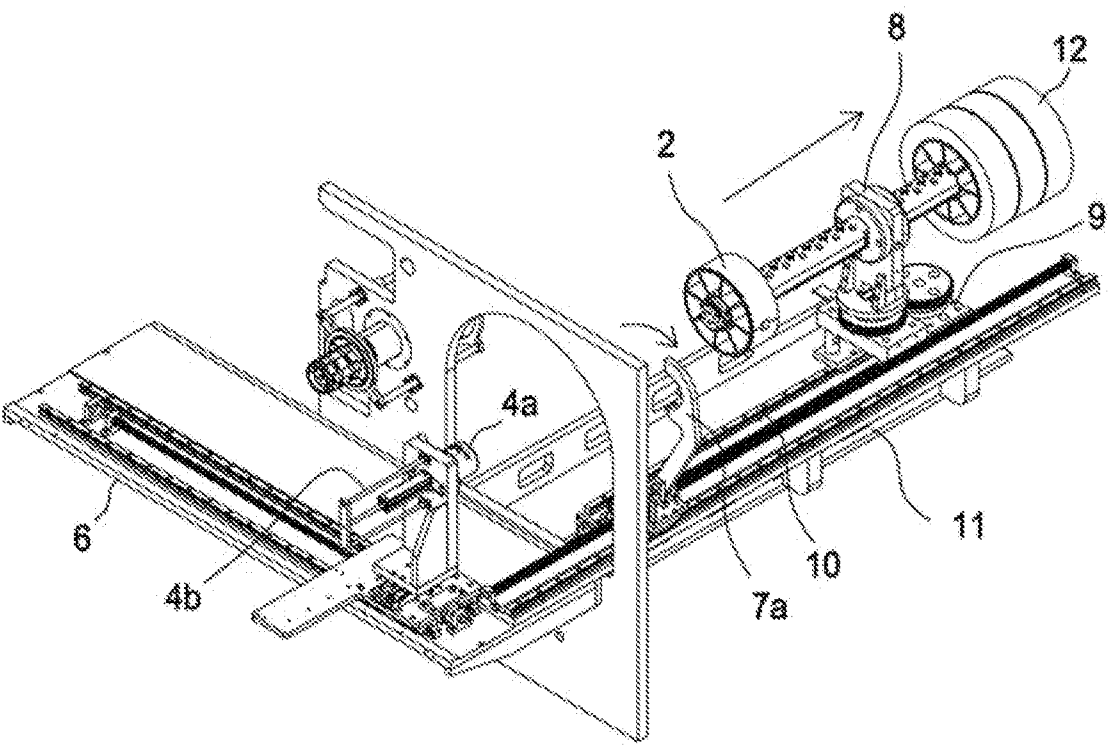
FIG. 4 is a perspective view showing operation in which an empty bobbin is mounted and moved on the bobbin changer of the present disclosure.
Figure 5:
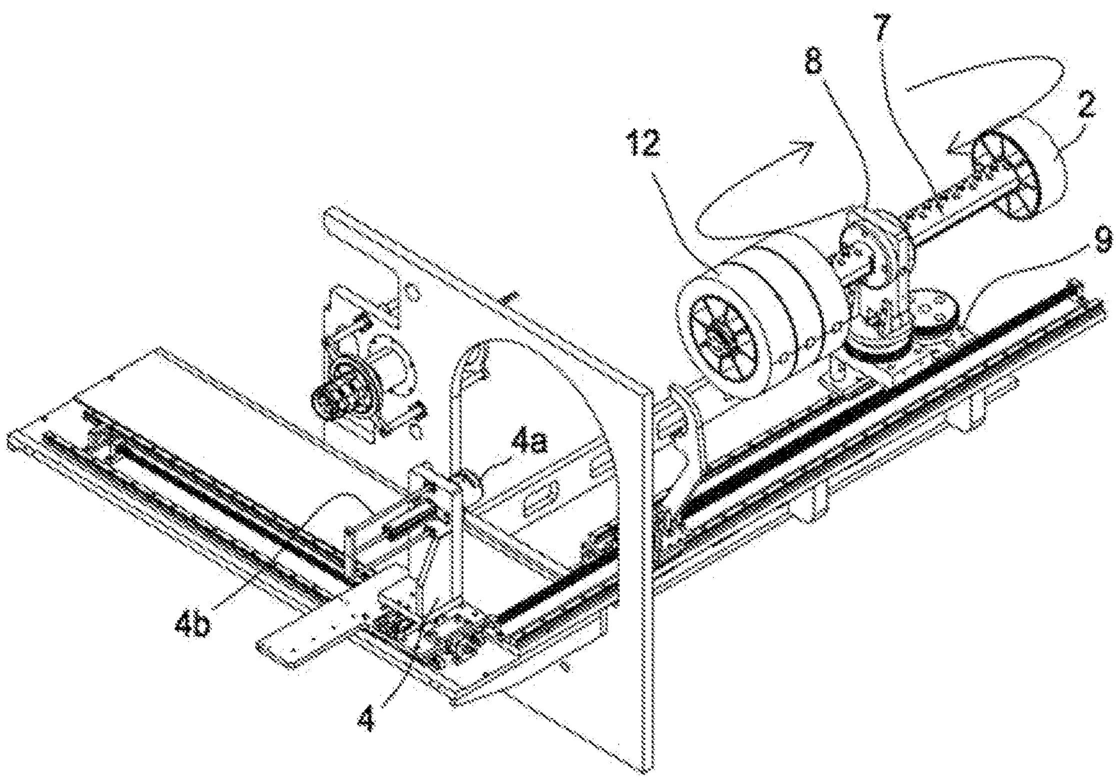
FIG. 5 is a perspective view showing operation of the bobbin changer moving a new bobbin forward while moving an empty bobbin rearward by rotating 180 degrees.
Figure 6:
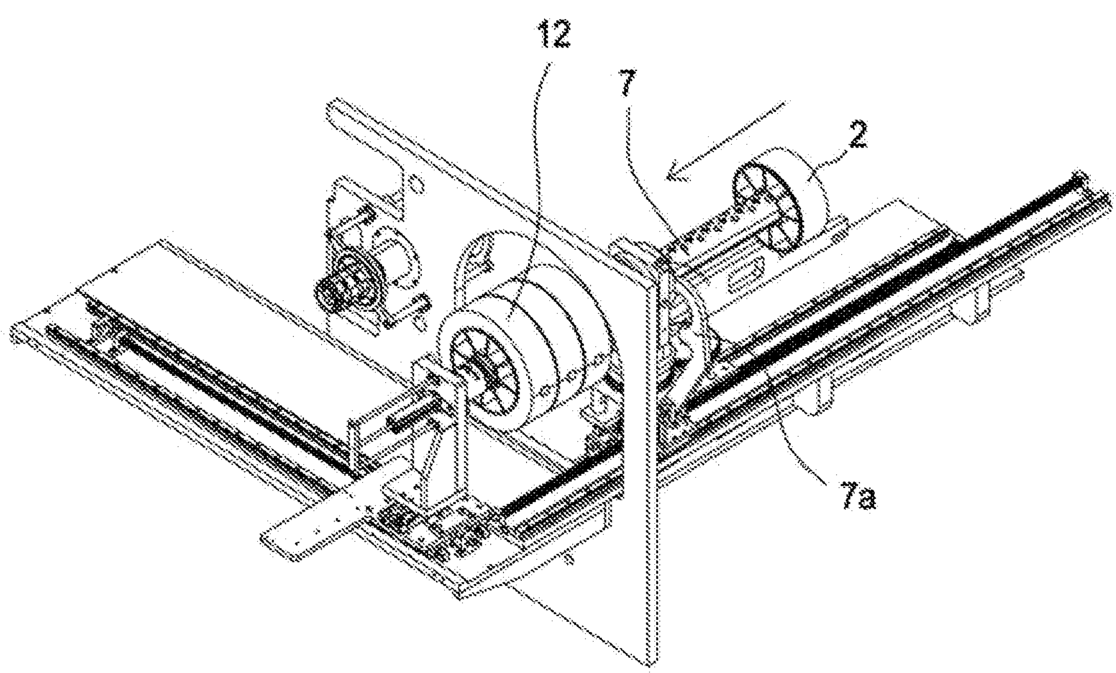
FIG. 6 is a perspective view showing operation of moving a new bobbin fed through 180-degree rotation in the present disclosure.
Figure 7:
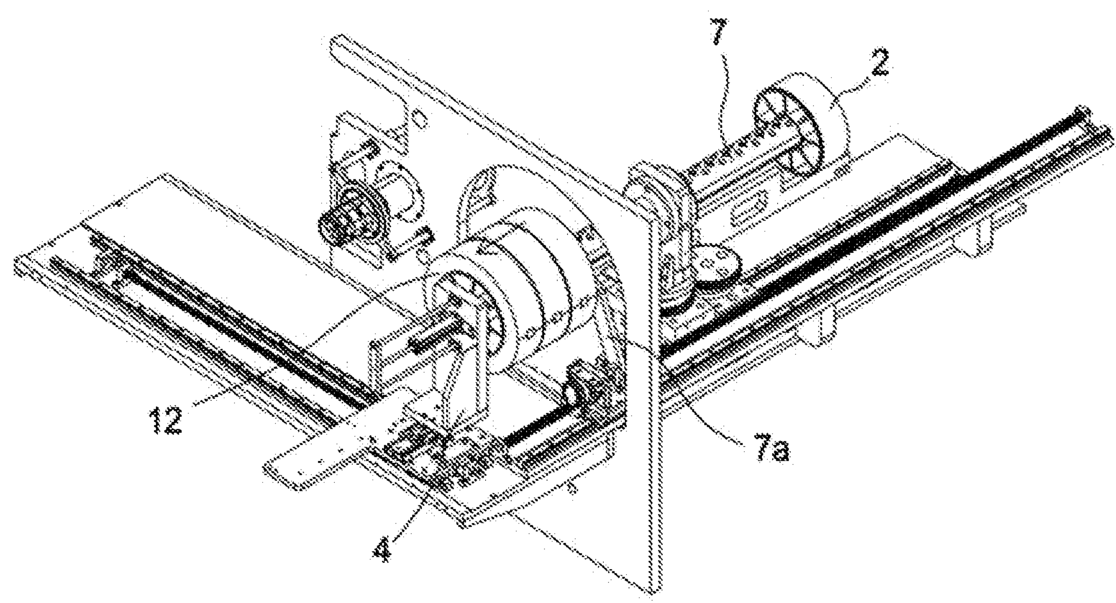
FIG. 7 is a perspective view showing operation of delivering a new bobbin of the present disclosure to the bobbin shifter.
Figure 8:
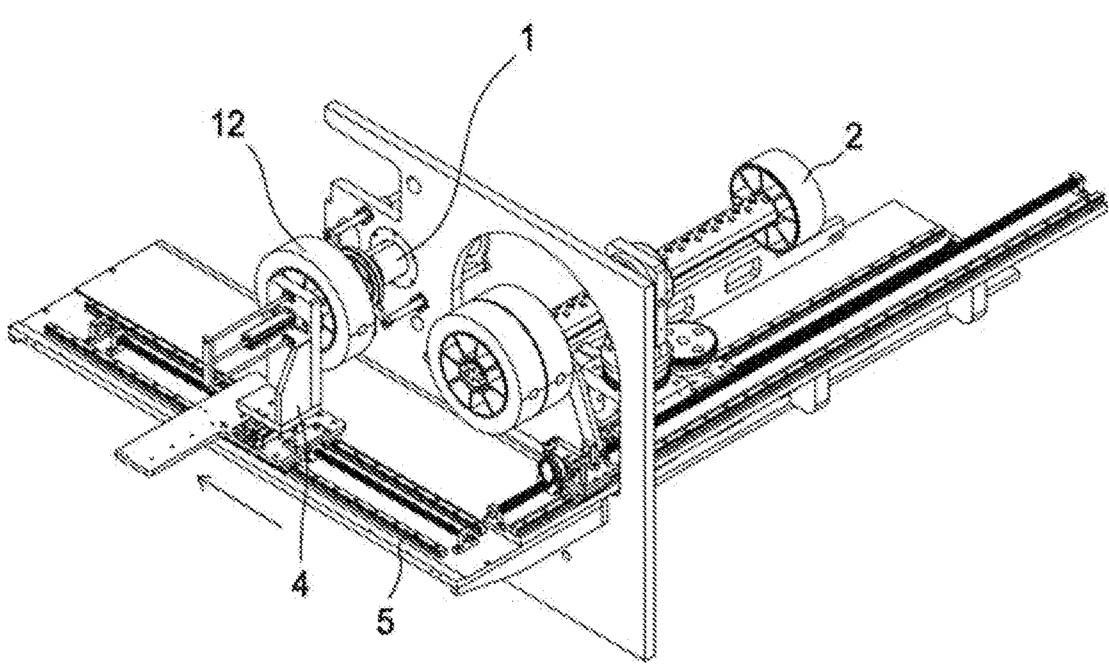
FIG. 8 is a perspective view showing operation of the bobbin shifter moving to replace a bobbin after receiving a new bobbin.
Figure 9:
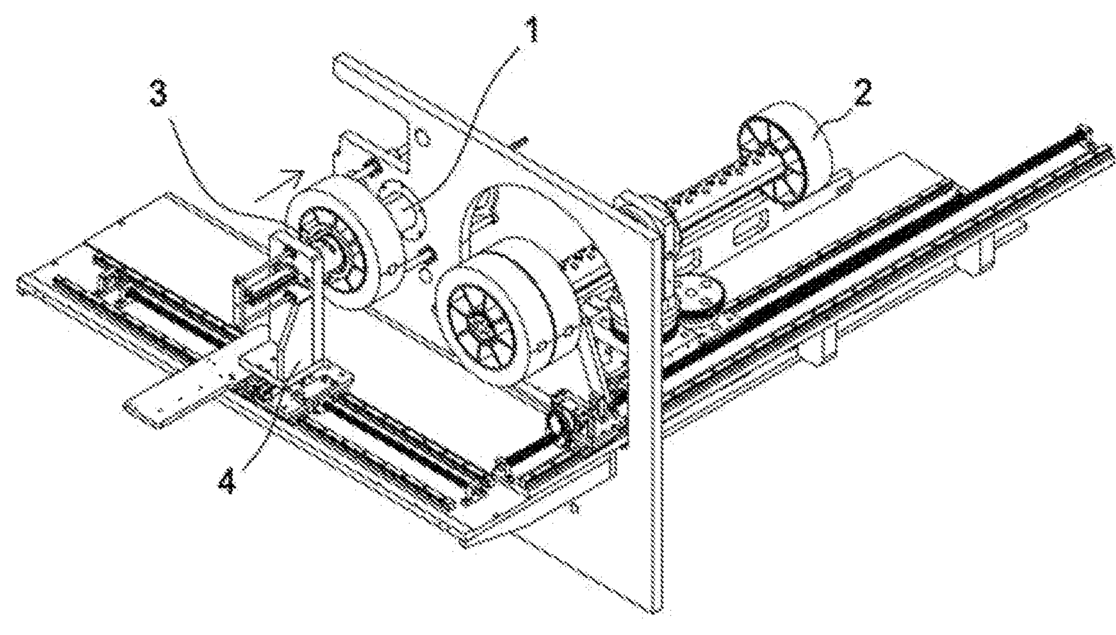
FIG. 9 is a perspective view illustrating operation of mounting a new bobbin delivered to the bobbin shifter of the present disclosure onto a spool by pushing it with a pusher.

FIG. 1 is a perspective view showing the entire configuration of the present disclosure, FIG. 2 is a perspective view showing operation of bobbin shifter moving to take an empty bobbin of the present disclosure, FIG. 3 is a perspective view showing operation of taking and delivering an empty bobbin of the present disclosure to a bobbin changer, FIG. 4 is a perspective view showing operation in which an empty bobbin is mounted and moved on the bobbin changer of the present disclosure, FIG. 5 is a perspective view showing operation of the bobbin changer moving a new bobbin forward while moving an empty bobbin rearward by rotating 180 degrees, FIG. 6 is a perspective view showing operation of moving a new bobbin fed through 180-degree rotation in the present disclosure, FIG. 7 is a perspective view showing operation of delivering a new bobbin of the present disclosure to the bobbin shifter, FIG. 8 is a perspective view showing operation of the bobbin shifter moving to replace a bobbin after receiving a new bobbin, and FIG. 9 is a perspective view illustrating operation of mounting a new bobbin delivered to the bobbin shifter of the present disclosure onto a spool by pushing it with a pusher, in which A bobbin shifter 20 is installed at a first side on one table and a bobbin changer 30 is installed at a second side. The bobbin shifter 20 is composed of a spool 1 for mounting a bobbin, an empty bobbin 2 mounted and used up on the spool 1, a pusher 3 pushing the empty bobbin 2 and then returning to the initial position, a deliverer 4 for receiving the empty bobbin 2 and then moving, a rail 5 installed on the bottom to move the deliverer 4, and a support 6 for supporting the rail 5.

The bobbin changer 30 installed at the second side on one table is composed of a straight cylindrical bobbin mount 7 for fitting a new bobbin on a first side and an empty bobbin on a second side for delivery, a guide 8 installed at the middle of the bobbin mount 7 to separate bobbins while restricting movement of an empty bobbin and a new bobbin, a turn table 9 for rotating the bobbin mount 7 180 degrees, a rail 10 for moving the turn table 9, and a support 11 supporting the rail 10.

When the empty bobbin 2 is taken from the spool 1 or is delivered to be mounted on the bobbin mount 7, or when they are operated in the opposite way, the bobbin is taken or delivered by pushing the bobbin with pushers 3, 4*b*, and 7*a* that are each driven by a cylinder.

The pusher 7*a* has a circular grooved end, is coupled to a circular rod of the bobbin mount 7, and is configured to push a bobbin to a side and to be able to rotate up and down. The pusher 7*a* has been rotated outward when the bobbin mount 7 is rotated 180 degrees, and is coupled back to the bobbin mount 7 ahead of a guide 8 when the bobbin mount 7 finishes rotating 180 degrees to be able to push a bobbin. The pusher 7*a* can be moved up and down and left and right by a cylinder.

The bobbin is fitted and fixed with a circular hole at the center of the bobbin horizontally aligned with the axis of the spool 1 or the circular bobbin mount 7.

In the figures, unstated reference numeral "8" indicates a guide for separating an empty bobbin 2 and a new bobbin 12 and unstated reference numeral "15" indicates a support for supporting the spool 1 and surrounding parts, and several circular projections are rotatably installed on the bobbin mount 7, thereby enabling smooth movement of a bobbin.

Operation of the present disclosure having this configuration is described.

According to the present disclosure, in the state in which the deliverer 4 of the bobbin shifter 20 positioned at a predetermined position at a side, as in FIG. 1, the deliverer 4 moves left on the rail 5 in the figures and stops accurately ahead of the spool 1 of an empty bobbin 2 to replace the empty bobbin 2 mounted on the spool 1.

Accordingly, when the deliverer 4 is positioned at the empty bobbin 2 mounted on the spool 1, the pusher 3 installed at the spool 1 pushes the empty bobbin 2 out of the spool 1 and simultaneously fits the empty bobbin 2 onto a cylindrical shaft 4*a* of the deliverer 4.

The deliverer 4 receiving the empty bobbin 2 moves on the rail 5 to the right in the figures and stops at a predetermined position, as in FIG. 3, and the empty bobbin 2 is fitted onto the bobbin mount 7 of the bobbin changer 30 with the deliverer 4 at the predetermined position. In this case, the pusher 4*b* installed at the deliverer 4 pushes the empty bobbin 2 out of the cylindrical shaft 4*a* and simultaneously fits and fixes the empty bobbin 2 on the bobbin mount 7.

Accordingly, as in FIG. 4, the bobbin mount 7 moves on the rail 10 to the end with the empty bobbin 2 thereon, and in this case, the pusher 7*a* rotates upward, thereby not interfering with movement of the bobbin mount 7. When the bobbin mount 7 is rotated 180 degrees after moving to the end of the rail 10, the empty bobbin 2 and a new bobbin 12 on the bobbin mount 7 are switched.

That is, as in FIG. 5, the empty bobbin 2 at the front is moved to the rear and the new bobbin 12 at the rear is moved to the front.

As in FIG. 6, when the bobbin mount 7 of the bobbin changer 30 moves on the rail 10 back to the left in the figures with the empty bobbin 2 and the new bobbin 12 switched by rotation of the bobbin mount 7, the pusher 7*a* pushes and fixes the one new bobbin 12 on the cylindrical shaft 4*a* of the deliverer 4 stopped at the predetermined position.

In this case, the pusher 7*a* is positioned up and moves down, thereby pushing the new bobbin 12 to a side with the cylindrical groove fitted on the front end of the guide 8. The pusher 7*a* can be moved up and down, and left and right by a cylinder.

Accordingly, as in FIG. 8, the deliverer 4 moves on the rail 5 to the left and then stops at a predetermined position to mount the new bobbin 12 on the spool 1, and, as in FIG. 9, the pusher 4*b* pushes and fixes the new bobbin 12 on the spool 1.

After the deliverer 4 of the bobbin shifter 20 mounts the new bobbin 12 on the spool 1, the deliverer 4 moves back on the rail and then stops and stands by at a predetermined position, as in FIG. 1.

Meanwhile, FIGS. 10 to 16 show a process of automatically extracting an end of an electrode separator for a secondary battery of the present disclosure.

Figure 10:
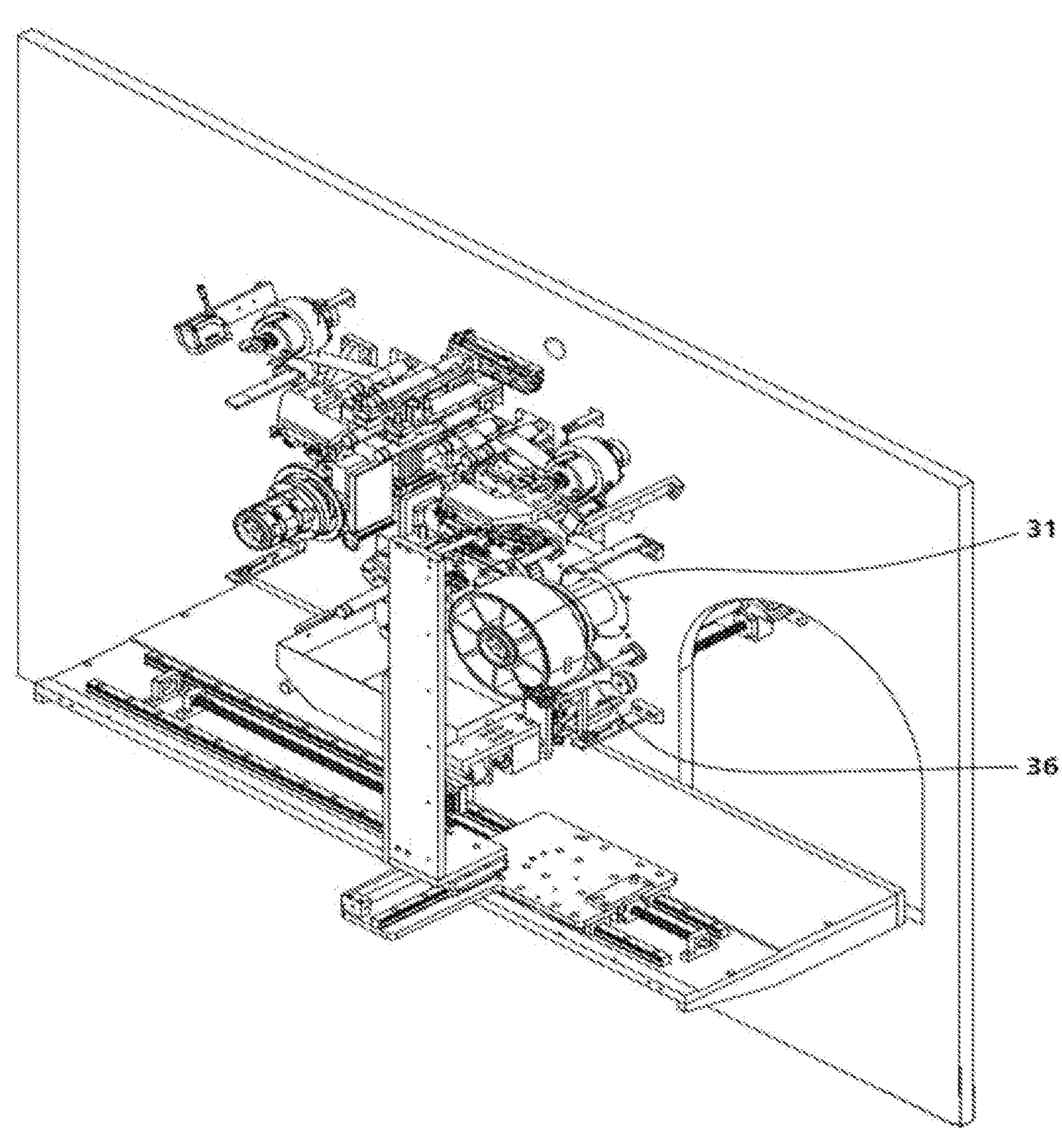
FIGS. 10 to 16 relate to automatic extraction of an electrode separator of the present disclosure.
Figure 11:
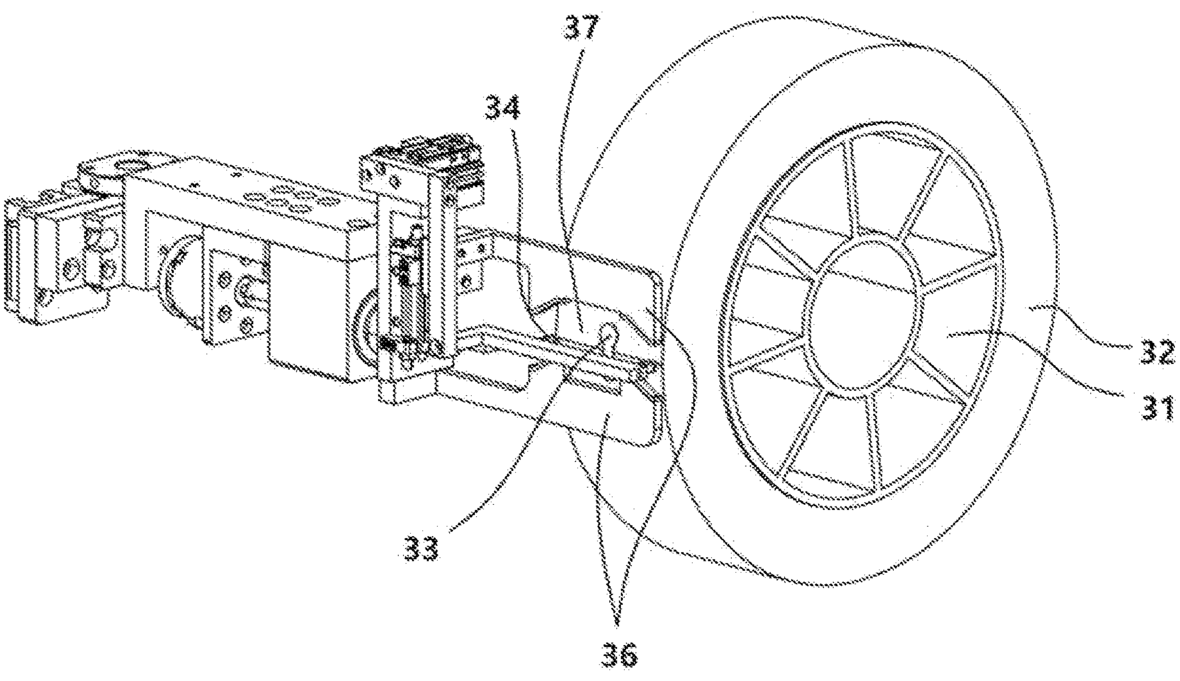
Figure 12:
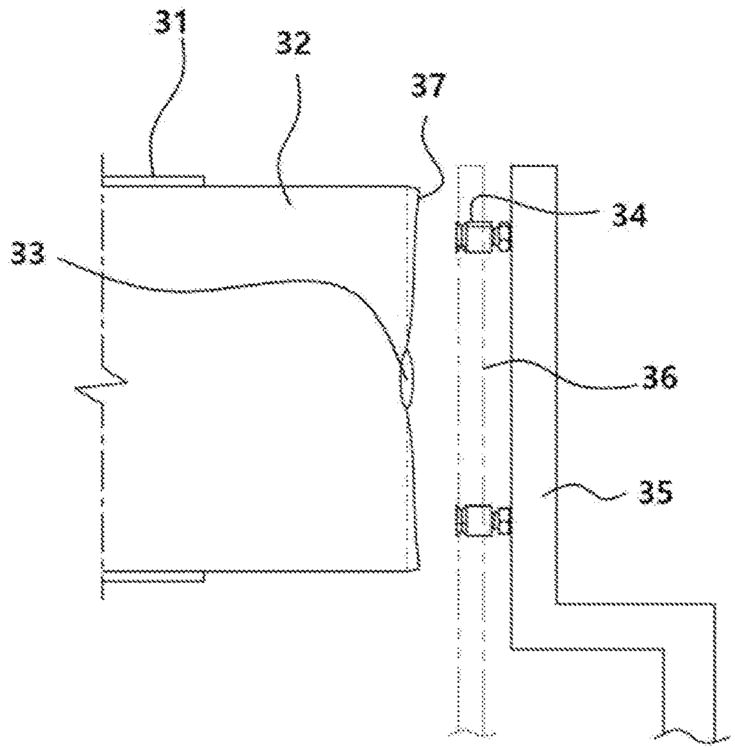
Figure 13:
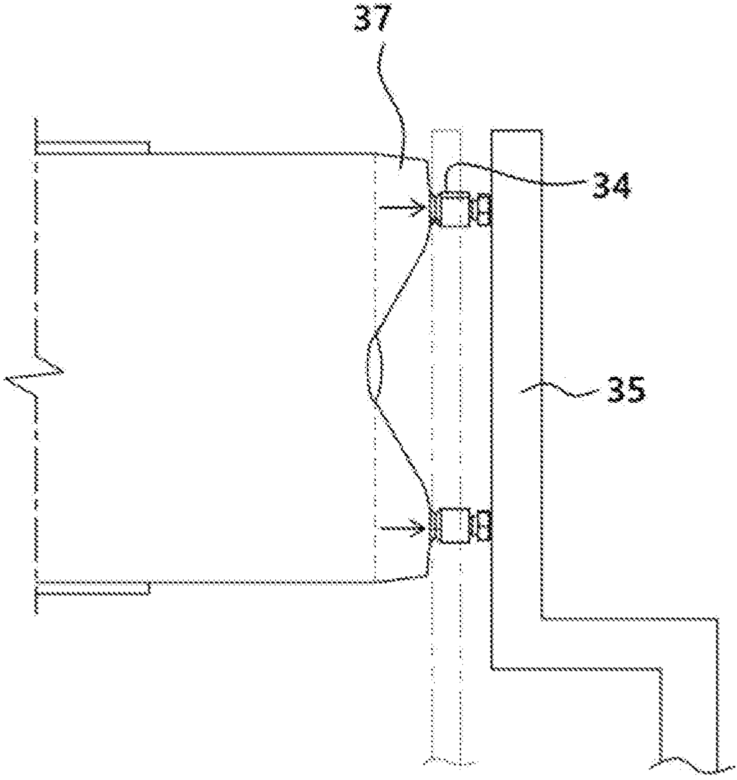
Figure 14:
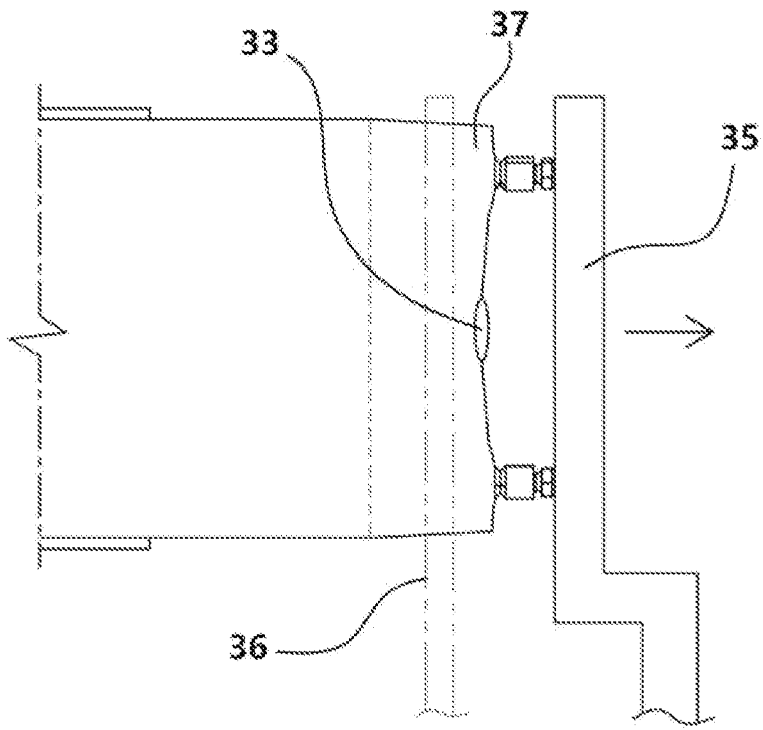
Figure 15:
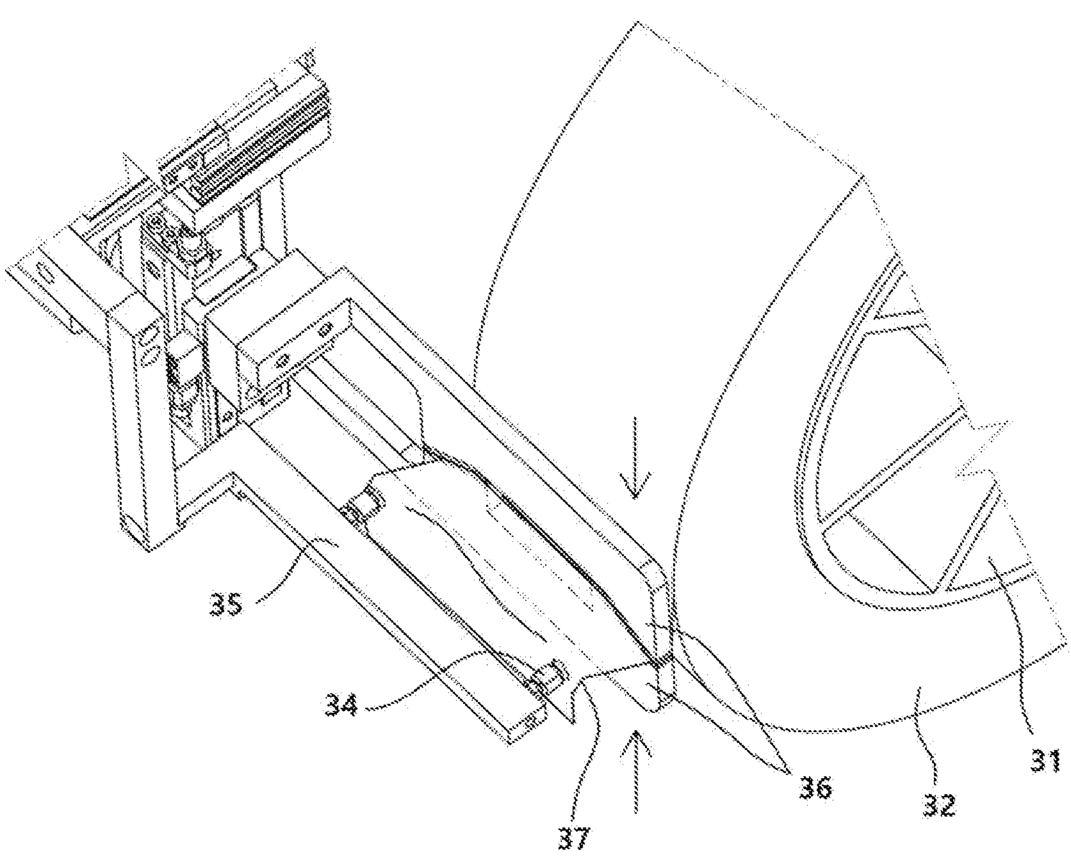
Figure 16:
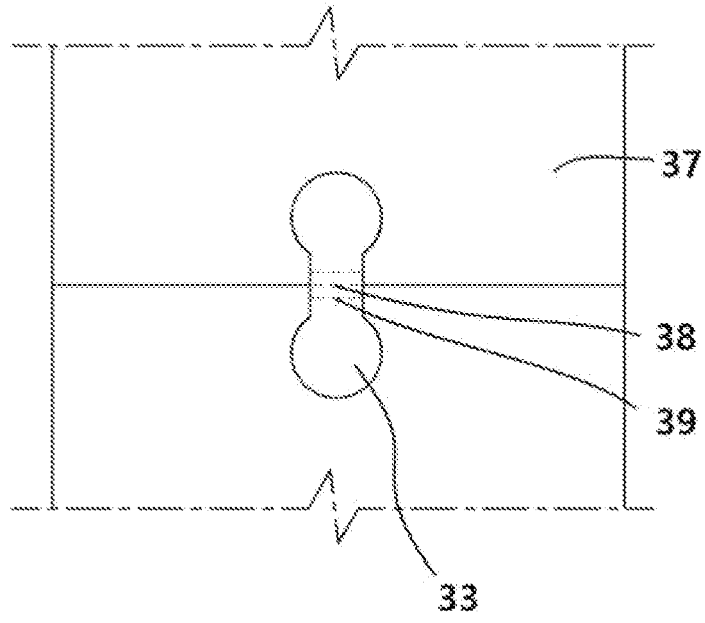

FIG. 10 is a view showing the entire configuration of automatic extraction of an end of an electrode separator, FIG. 11 is a perspective view showing the state in which a holder is positioned at an electrode separator end of the present disclosure, FIG. 12 is a plan view showing the positions of a separator, a suctioner, and a holder of the present disclosure, FIG. 13 is a view showing the state in which the suctioner of the present disclosure has suctioned an end portion of a separator, FIG. 14 is a view showing the state in which an adhesive sticker at the center has been separated by the suctioner of the present disclosure suctioning and pulling a separator, FIG. 15 is a perspective view showing the state in which an end portion of a separator is held and fixed by an up-down holder of the present disclosure, and FIG. 16 is a view showing an adhesive sticker of the present disclosure. As shown in the figures, a separator 32 is wound on a bobbin 31 and an adhesive sticker 33 is bonded to an end, an automatic extractor is composed of a suctioner 34 positioned ahead of both sides of the adhesive sticker 33 to perform vacuum suction by a cylinder, etc., a tow bar 35 for fixing the suctioner 34, and a holder 36 installed over and under the front end of the suctioner 34 to pull and fix an end of the separator 32 over and under the end when the end is pulled to protrude, and unstated reference numeral "37" indicates a separator end in the figures.

However, the adhesive sticker 33 has a perforated line 38 at the center and other perforated lines 39 are formed over and under the perforated line 38, respectively, so when the separator 32 is pulled by vacuum suction, the perforated lines 38 and 39 of the adhesive sticker 33 are easily torn and separated.

In FIGS. 10 to 16, an electrode separator 32 is wound on the bobbin 31. The adhesive sticker 33 is attached to an end of the electrode separator 32 and the end is fixed. The separator end 37 is detached and both ends of the end are held and connected to another electrode separator to be used.

When an end of the electrode separator 32 is separated and connected to another electrode separator to be used, as described above, it is usually difficult to separate the end of the electrode separator 32. Accordingly, in the present disclosure, the perforated line 38 is formed at the center of the adhesive sticker 33 not as a simple adhesive sticker by improving the structure of the adhesive sticker 33, and another perforated line 39 is formed over and under the perforated line 38 so that when the end 37 is pulled, the end is separated while the perforated lines 38 and 39 of the adhesive sticker 33 are easily torn.

That is, when the suctioner 34 is positioned ahead of both sides of the end 37 of the separator 32, as in FIG. 12, and the end is vacuum-suctioned by the suctioner 34, as in FIG. 13, both sides of the end 37 of the separator 32 are pulled out. In this case, as in FIG. 14, the adhesive sticker 33 attached to the center of the end 37 is easily torn by the perforated lines 38 and 39 and the entire end 37 is pulled up.

In this case, the end 37 of the electrode separator 32 is set to be automatically positioned at the suctioner 34 by a sensor, etc.

When the end 37 of the separator 32 is pulled to protrude, the holder 36 installed over and under the separator end 37 is driven by a motor or a cylinder, thereby holding and firmly fixing the end 37.

Accordingly, it is possible to make separators be continuously supplied by immediately pulling up and connecting the end 37 of the separator 32, which has been pulled by vacuum suction, to another electrode separator.

Meanwhile, FIGS. 17 to 31 show operation of automatically taping an end of an electrode separator for a secondary battery of the present disclosure.

Figure 17:
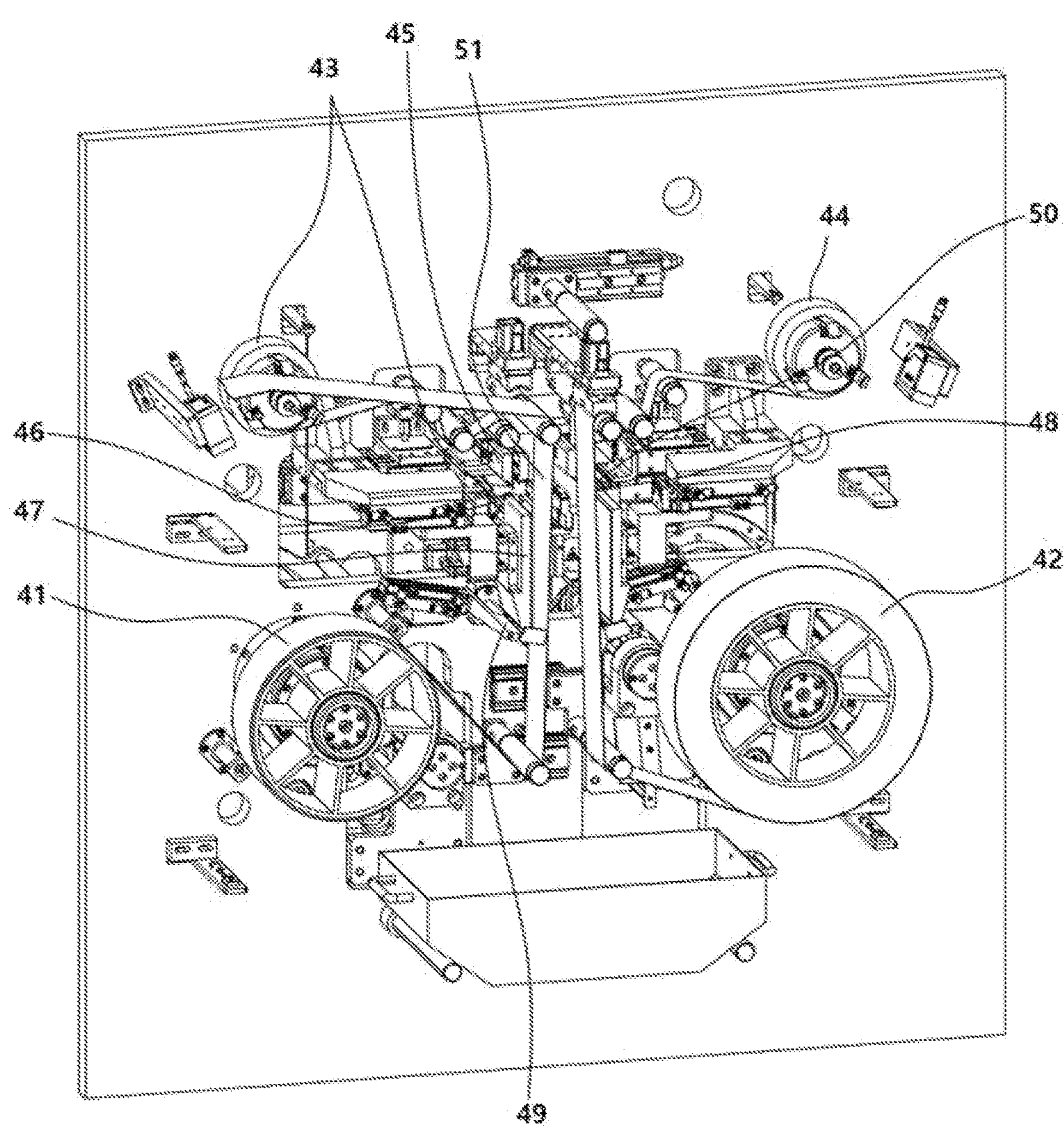
FIGS. 17 to 31 relate to automatic taping connection of an electrode separator end of the present disclosure.

FIG. 17 is a perspective view in which a separator is prepared ahead and an adhesive film is prepared behind in the present disclosure, in which an empty bobbin 41 and a new bobbin 42 are rotatably installed at the left and right of a center, adhesive films 43 and 44 are rotatably installed at the upper ends of the empty bobbin 41 and the new bobbin 42, an adhesive film holder A 45 and an adhesive film holder B 46 are installed, and a separator suctioner 47, an adhesive film suctioner 48, a separator cutter 49 for cutting a separator, and an adhesive film cutter 50 for cutting an adhesive film are installed, in which unstated reference numeral "51" indicates a separator.

In FIGS. 17 to 31, in order to automatically bond and connect a new separator to a separator that is almost completely used using an adhesive film, two wound adhesive films 43 and 44 installed at both sides of the upper end of a body are cut and inaccurately attached to a separator 51 and the separator 51 is connected to each of exposed adhesive surfaces having adhesion, whereby one continuous separator 51 can be achieved.

Figure 18:
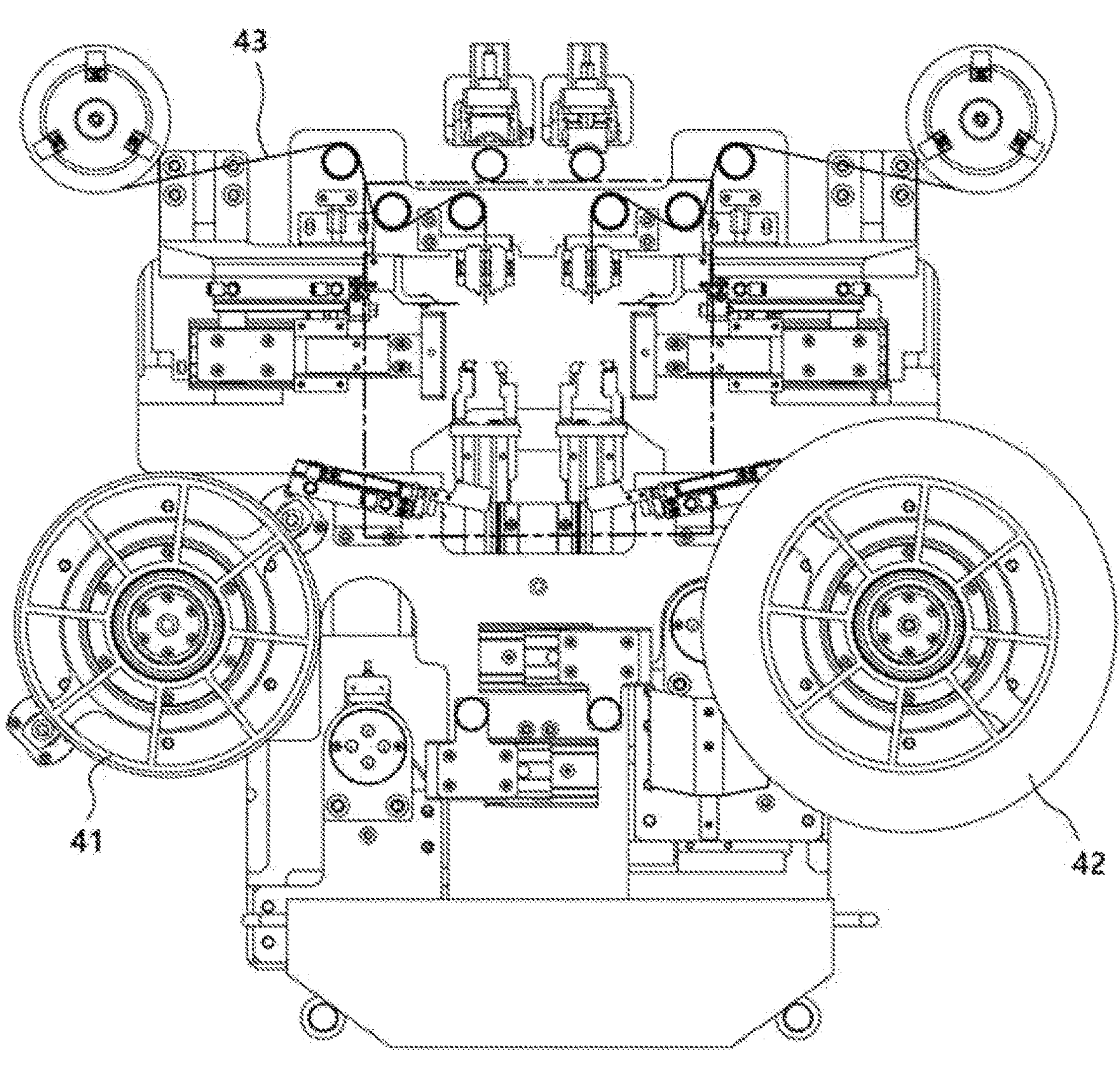

FIG. 18 is a front view excluding the separator 51 and the separator suctioner 47 in the present disclosure, and shows a process of cutting and bonding a pair of adhesive films 43 to each other.

Figure 19:
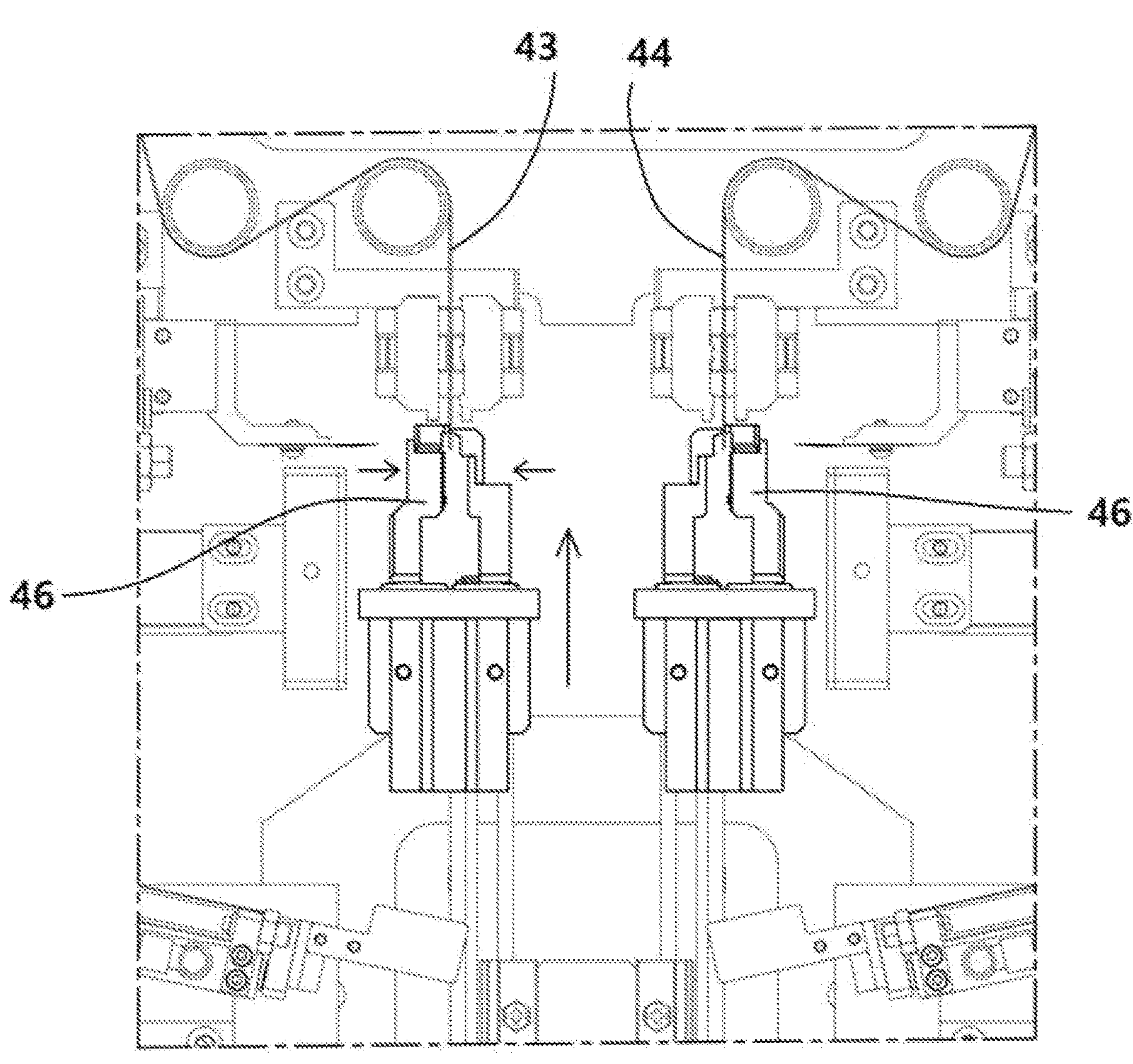

A pair of left and right holders B 46 of the present disclosure move up and hold ends of a pair of left and right adhesive films 43 and 44, as in FIG. 19.

Figure 20:
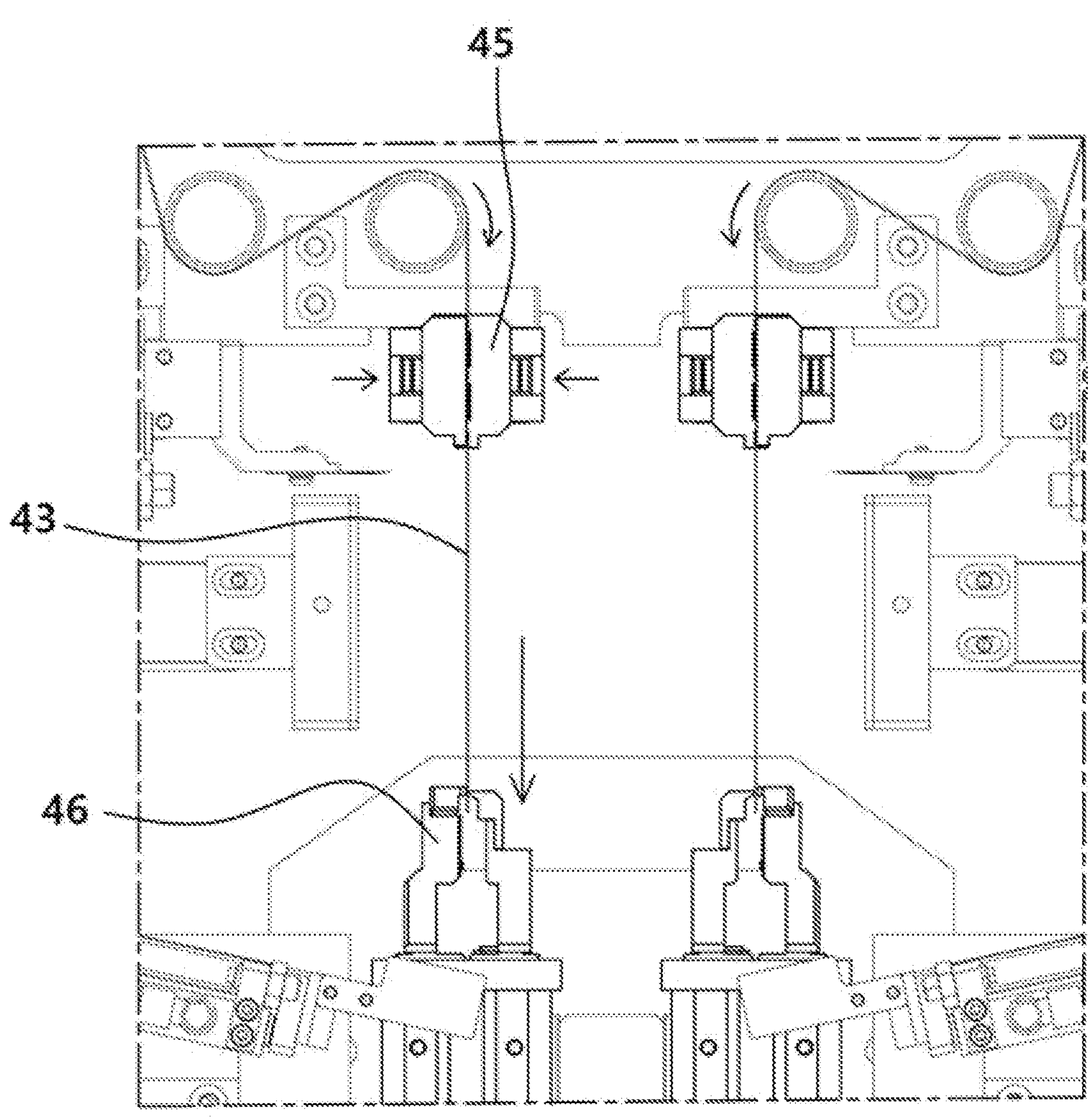

Then, as in FIG. 20, the holder B 46 moves down and pulls the adhesive film 43 and the upper portion of the adhesive film 43 is held and fixed by the holder A 45.

Figure 21:
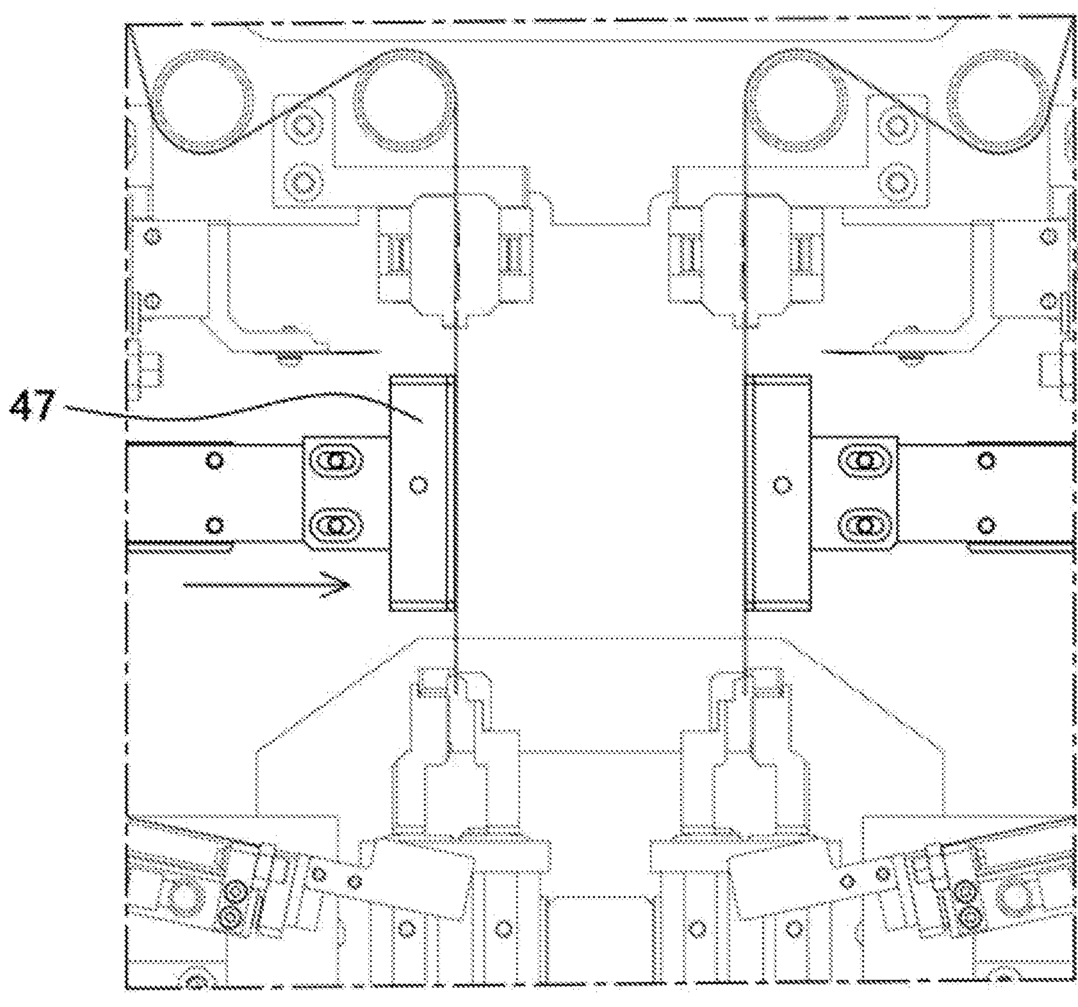
Figure 22:
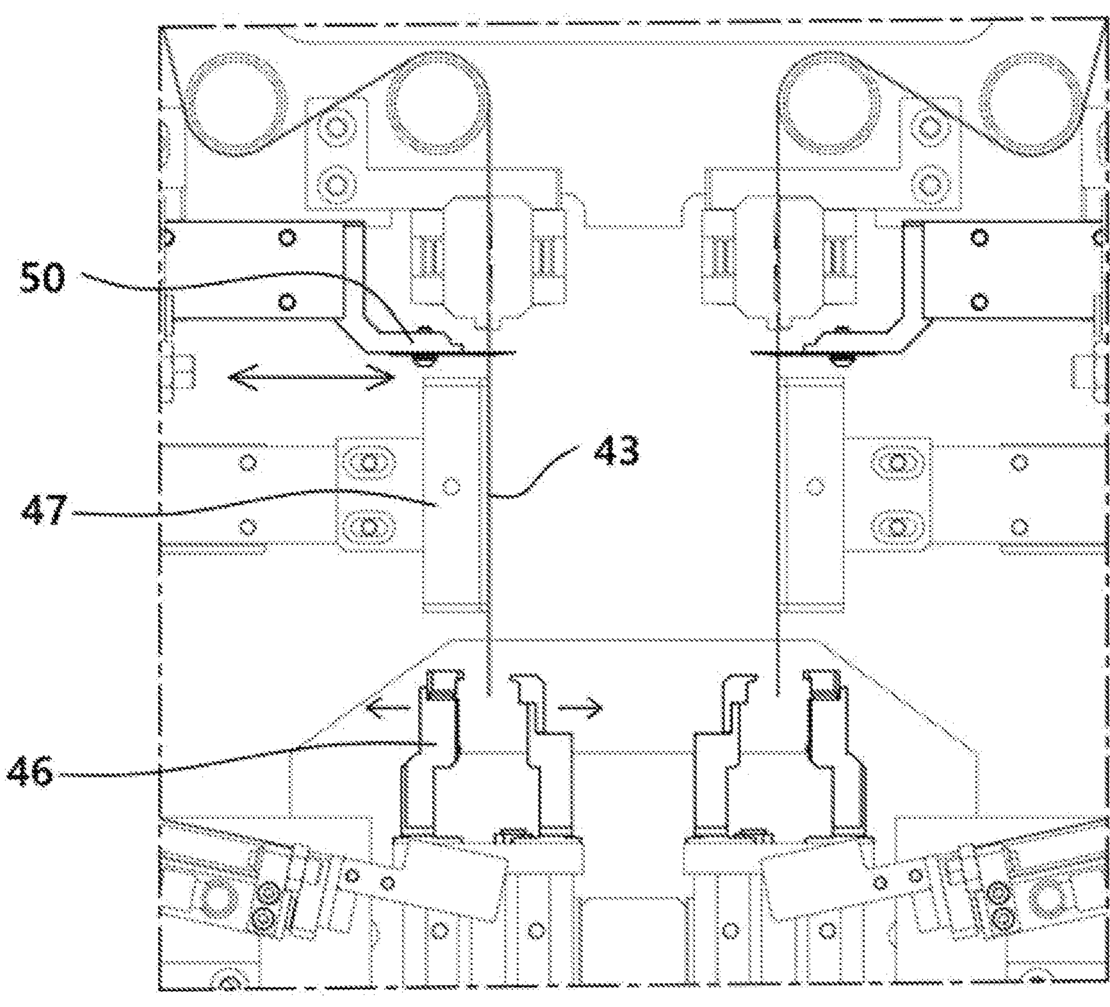
Figure 23:
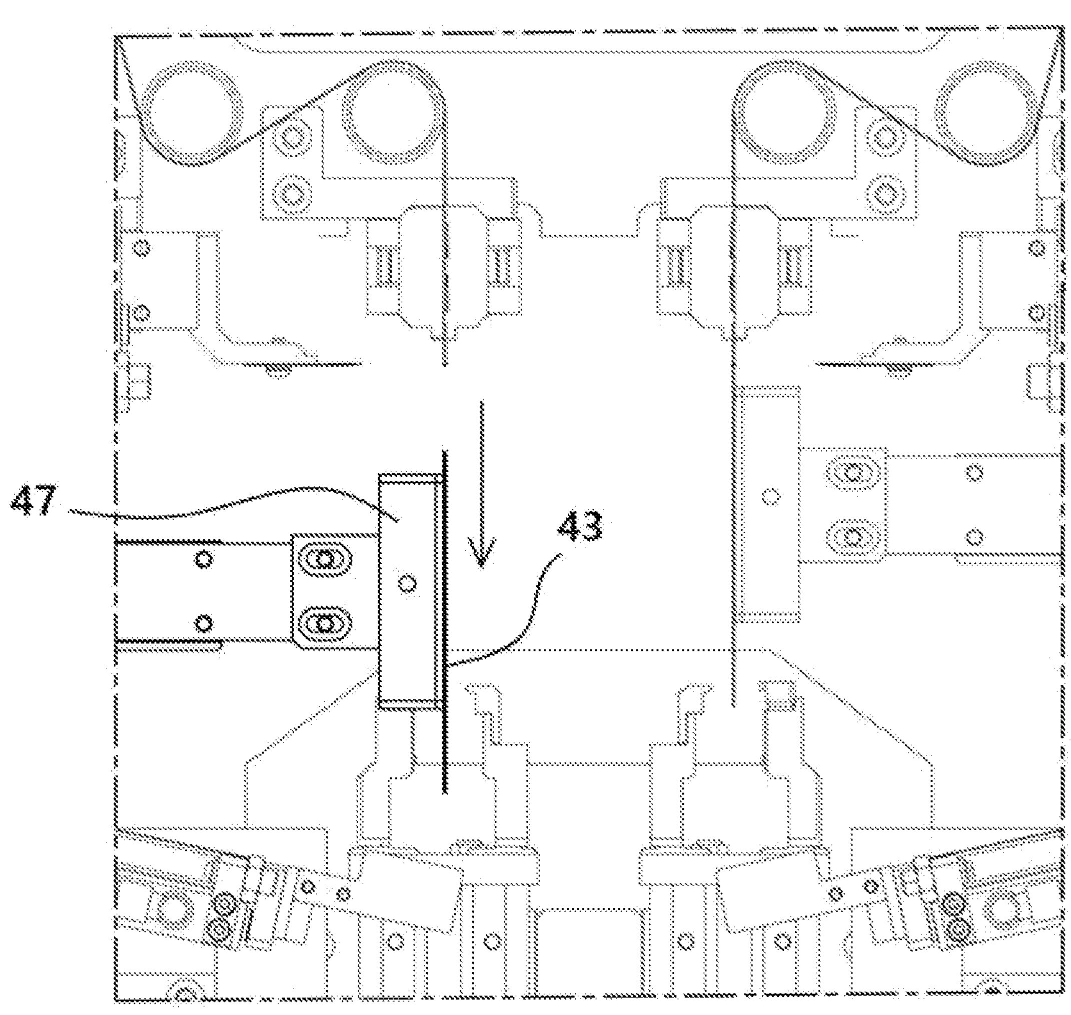

In this state, when the suctioner 37 suctions and holds the adhesive film 43, as in FIG. 21, and the cutter 50 cuts the adhesive film 43 and then moves back, as in FIG. 22, the holder B 46 opens and releases the adhesive film 43.

Accordingly, though not shown in figures, the holder B 46 moves back not to interfere with the adhesive film 43 and the cut adhesive film 43 remains attached to the separator suctioner 47 by air suction force.

Further, with the cut adhesive film 43 attached to the separator suctioner 47, as in FIG. 3, the separator suctioner 47 is slightly moved down, and the left and right suctioners

Figure 24:
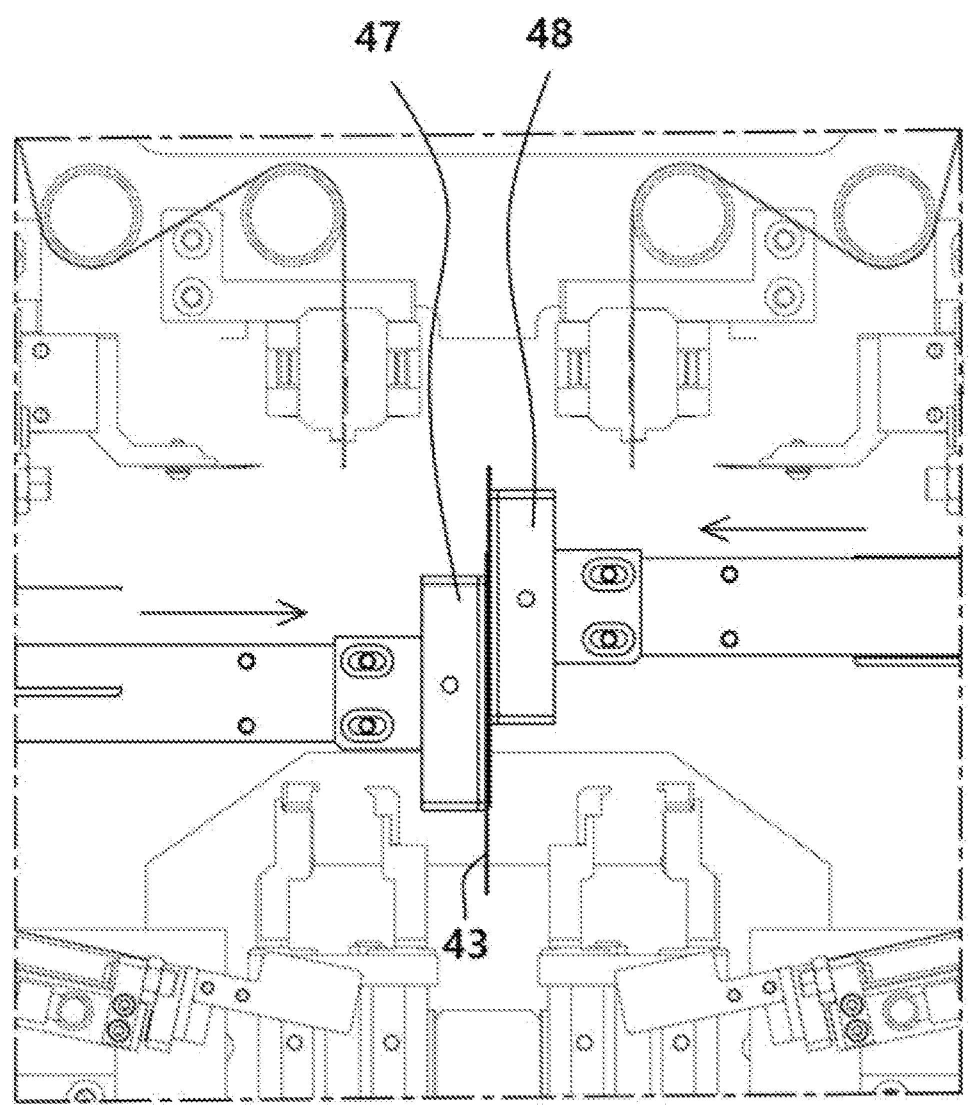

47 and 48 are moved to the center toward each other, as in FIG. 24, whereby the two sheets of adhesive films 43 and 44 are attached to each other.

Figure 25:
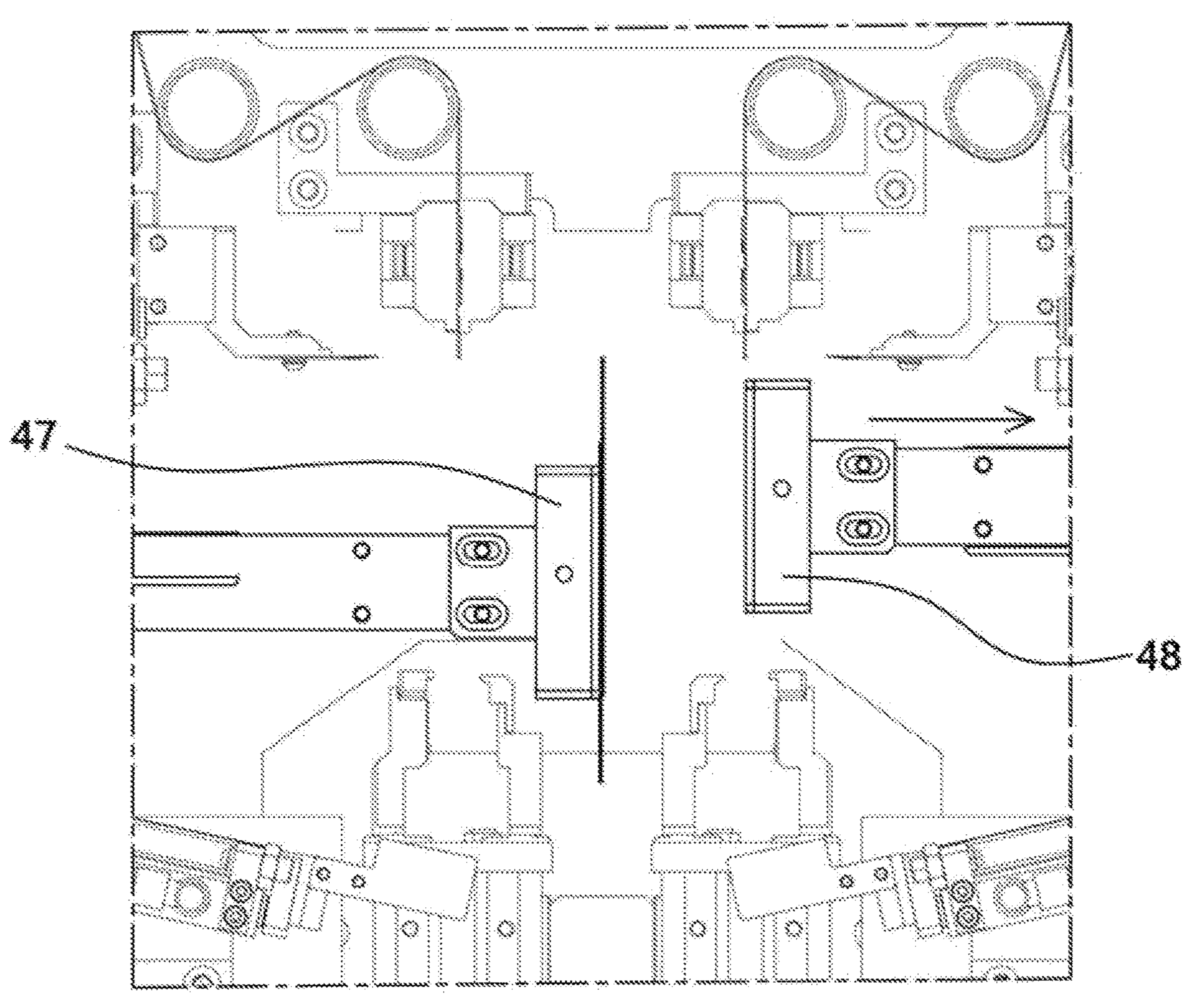

In this state, as in FIG. 25, since the two sheets of adhesive films 43 and 44 are inaccurately attached, the non-overlapping adhesives on the adhesive films 43 and 44 are exposed to the outside.

Further, right adhesive film suctioner 48 stops air suction and moves to the right as indicated by an arrow with the adhesive film 44 on the separator suctioner 47.

Figure 26:
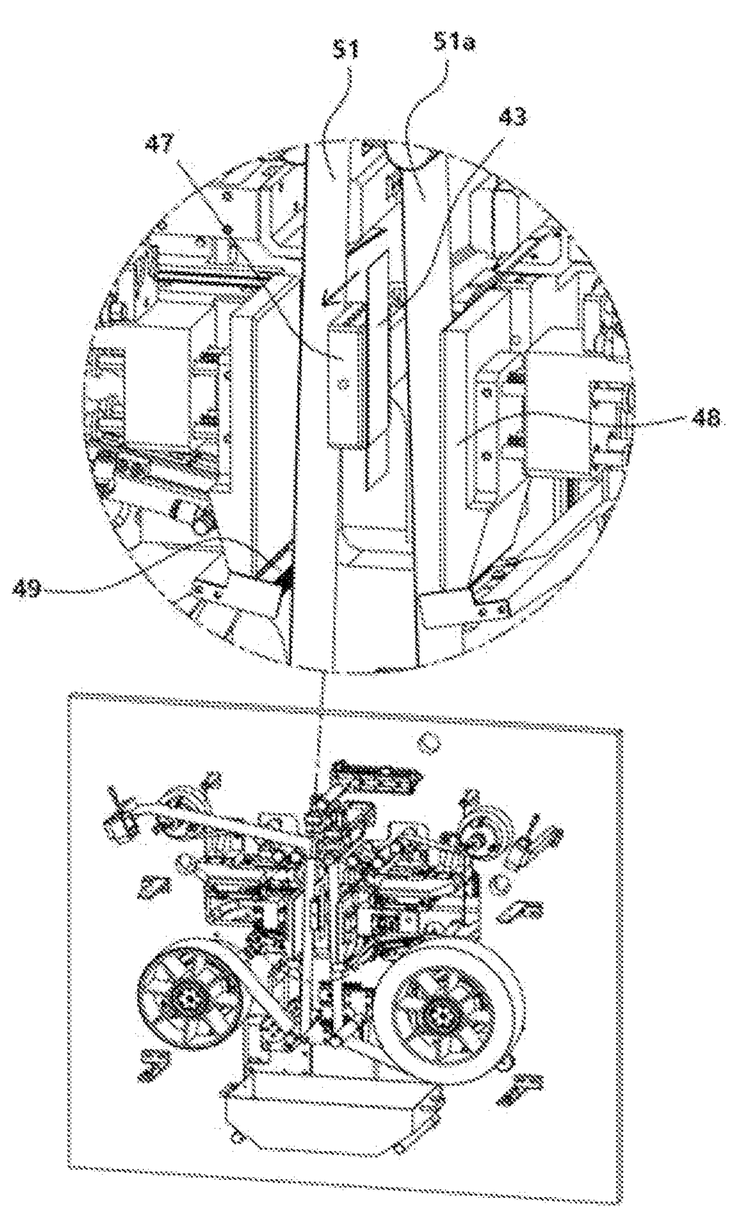

FIG. 26 enlarges and shows a separator joint in a dotted-line circle and shows operation of connecting a new separator to an end of an almost used-up separator 51, in which the separator suctioner 47 is moved forward to be positioned between the adhesive film 43 and the separator 51.

Figure 27:
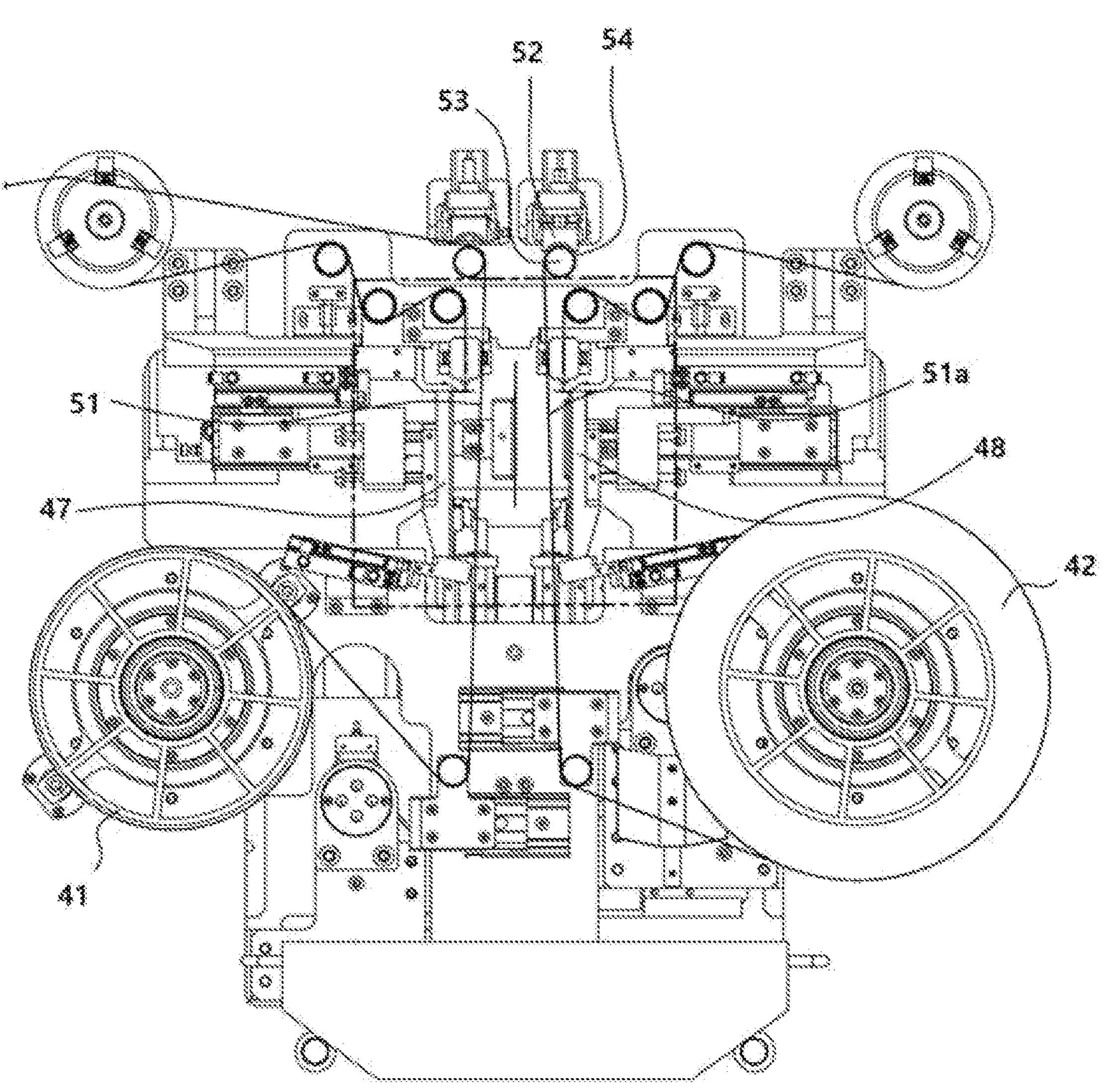

FIG. 27 is a front view including the separator and the separator suctioner 47 excluded in FIG. 19, in which a new bobbin 42 is prepared and a start end 54 of a new separator coming out from the new bobbin 42 is fitted and fixed between a presser 52 and a roller 53.

Figure 28:
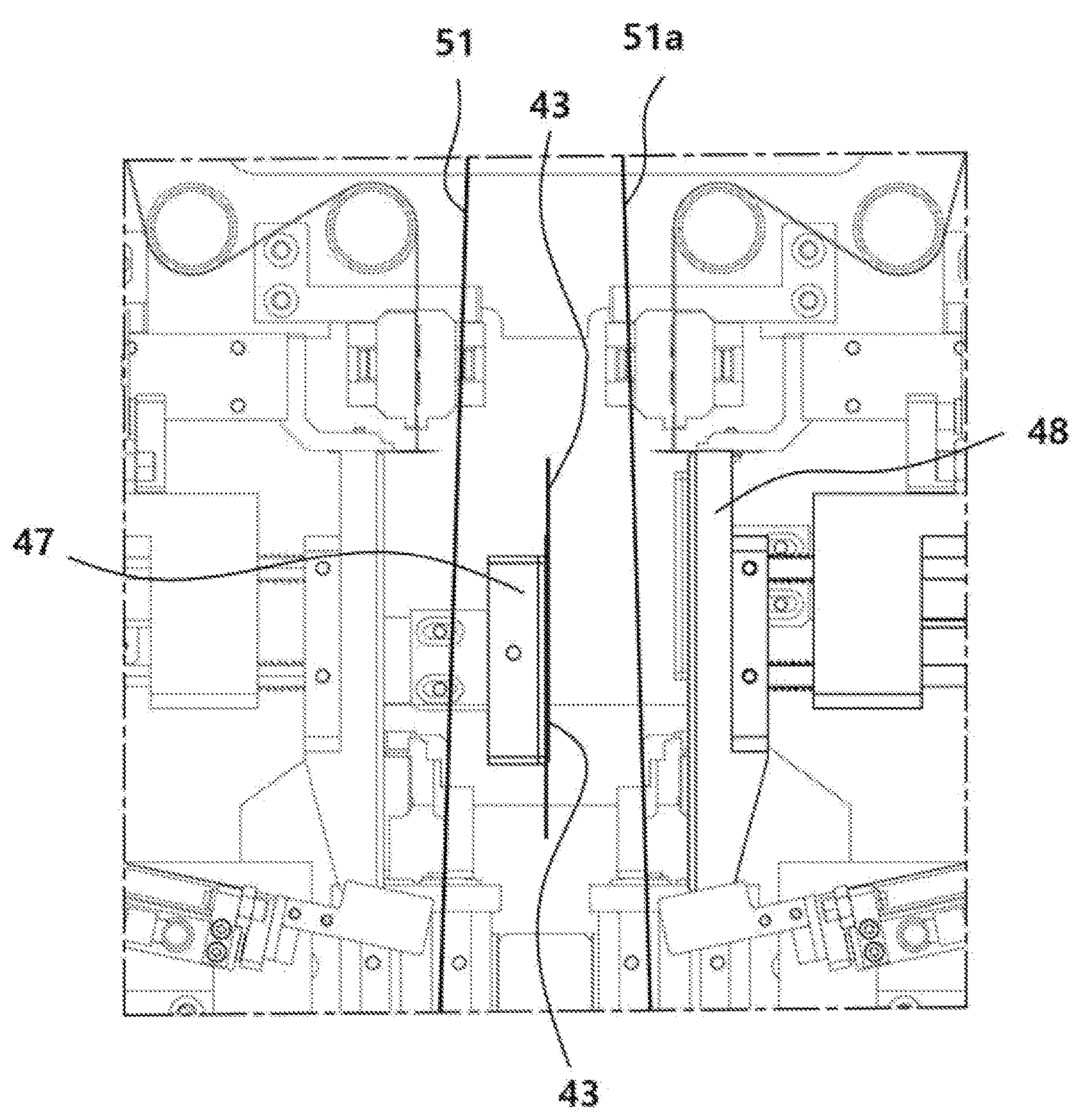
Figure 29:
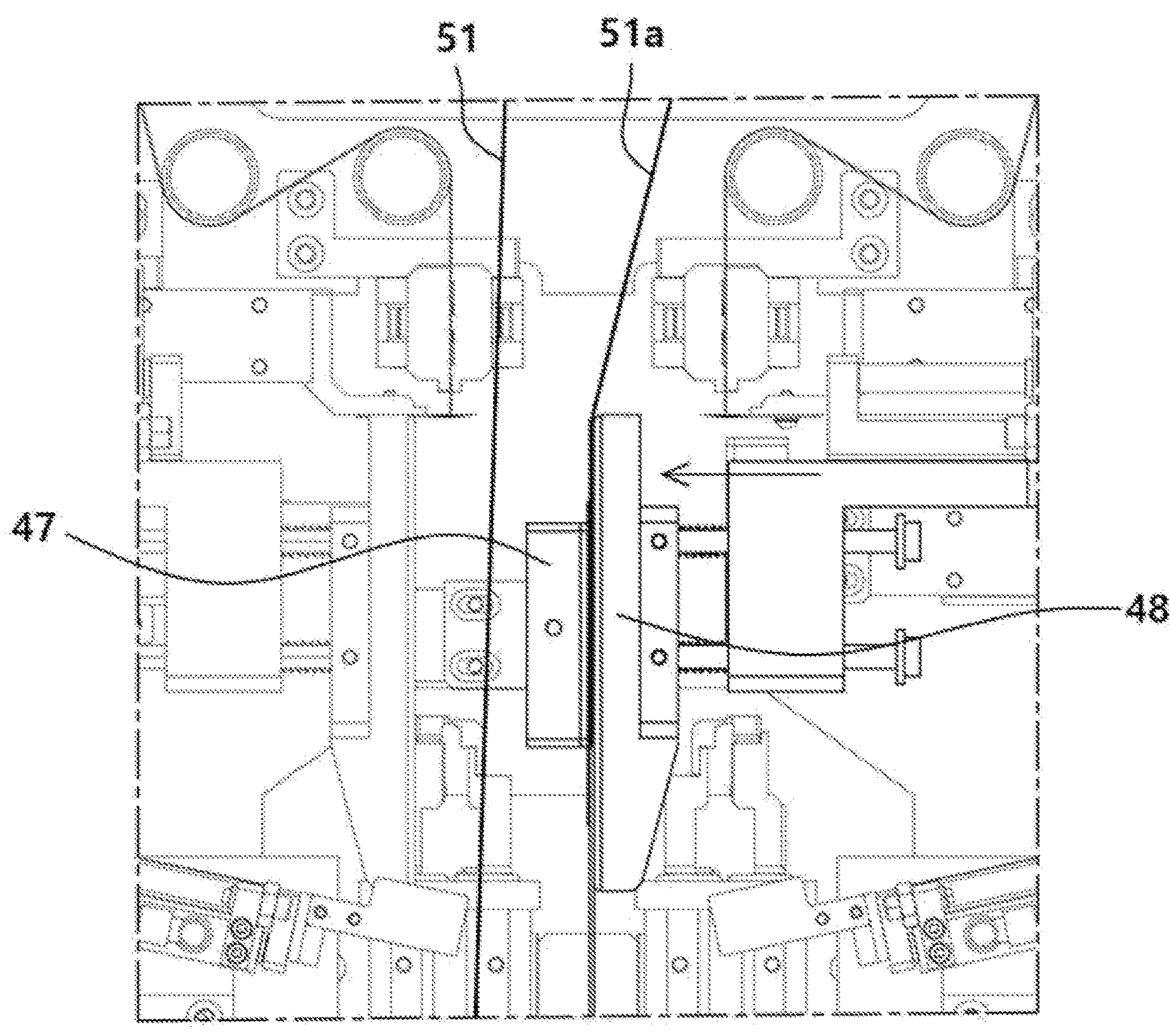

Then, as in FIGS. 28 and 29, the adhesive film suctioner 48 brings a right separator 51*a* in contact with an adhesive surface of the adhesive film 43 by pushing it in the direction of a left arrow, and then the separator suctioner 47 stops air suction and moves back.

Figure 30:
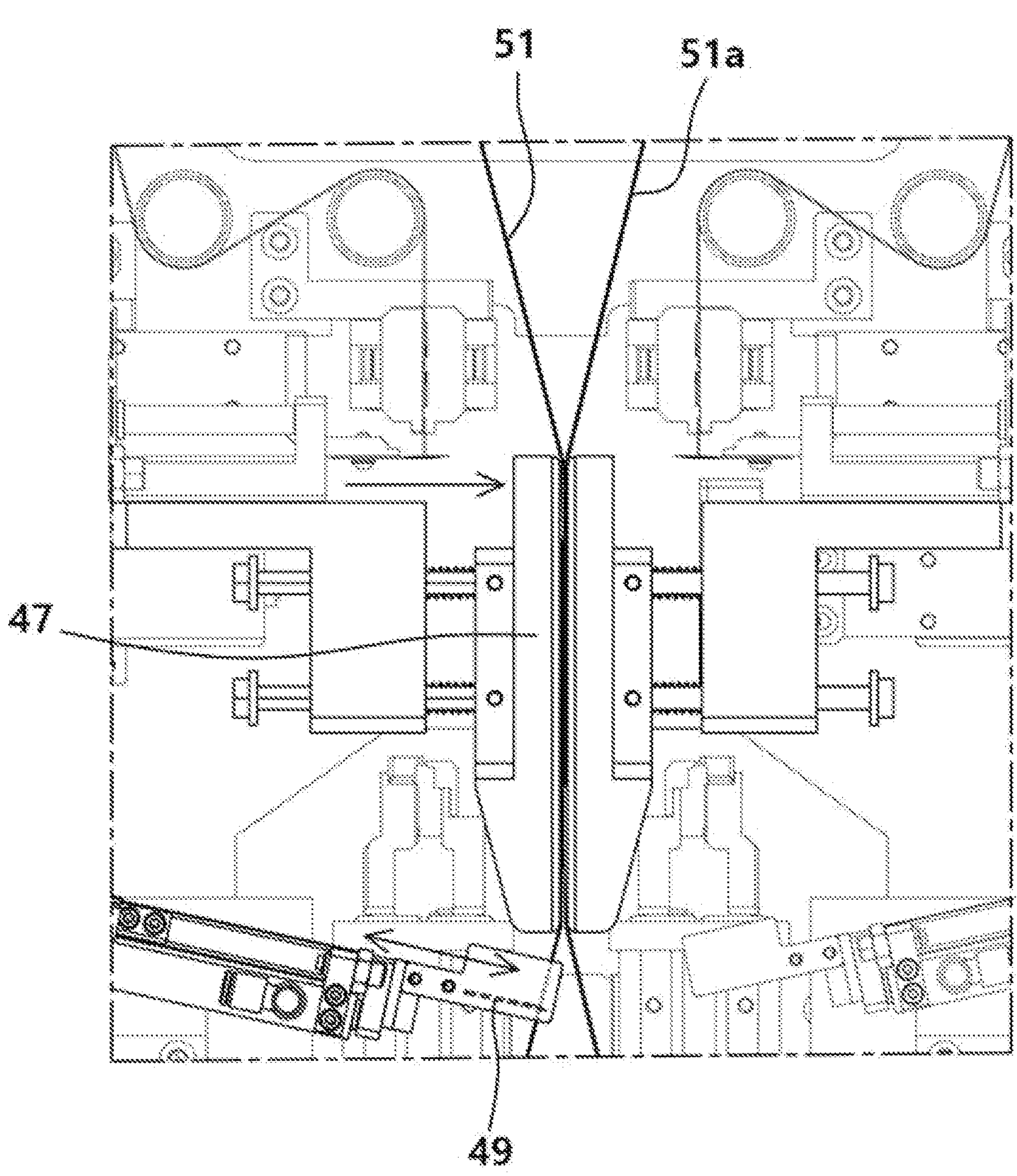

Then, as in FIG. 30, the separator suctioner 47 attaches a left separator 51 to the adhesive surface of the adhesive film 43 by pushing it in the direction of a right arrow, whereby separators are bonded to both sides of the adhesive films 43 and 44 having adhesion.

Figure 31:
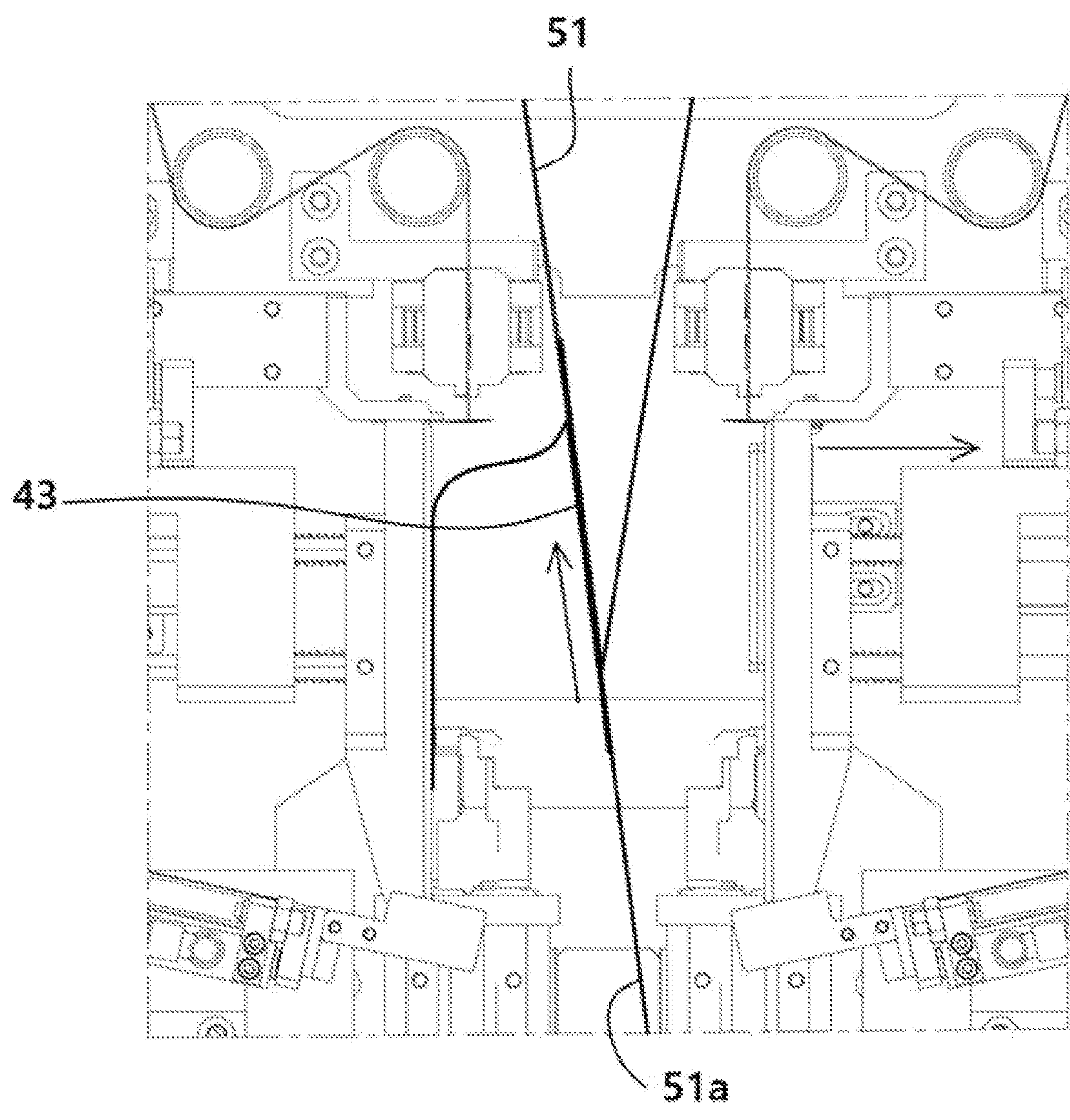

Next, as in FIG. 31, the presser 52 shown in FIG. 27 is released and the left separator 51 is pulled, whereby the right separator 51*a* finishes being bonded to the adhesive film 43.

That is, the separator 51 and the separator 51*a* are suctioned and bonded to both adhesive surfaces of the adhesive film 43, respectively, by the suctioner 47, whereby they are supplied as one complete separator.

What is claimed is:

1. A secondary battery electrode film and separator supply device comprising:

a bobbin extractor and shifter installed at a first side of the secondary battery electrode film and separator supply device and a bobbin changer installed at a second side of the secondary battery electrode film and separator supply device, wherein the bobbin extractor and shifter includes a spool for mounting a first bobbin for supplying a secondary battery electrode film or separator, a pusher configured to push the first bobbin from the spool when the first bobbin becomes empty and then returning to an initial position, a deliverer configured to receive the empty first bobbin from the spool and then moving the empty first bobbin to the bobbin changer using a rail installed on a bottom support of the secondary battery electrode film and separator supply device, and the bobbin changer includes a straight cylindrical bobbin mount configured to fit a new second bobbin on a first side of the bobbin mount and receiving the empty first bobbin from the deliverer on a second side of the bobbin mount, a guide installed at the middle of the bobbin mount to separate and restrict movement of the empty first bobbin and the new second bobbin, a turn table configured to rotate the bobbin mount 180 degrees to swap the positions of the empty first bobbin and the new second bobbin, and a rail installed on a support configured to move the turn table towards the deliverer to receive the empty first bobbin from the deliverer and deliver the new second bobbin to the deliverer.

2. The secondary battery electrode film and separator supply device of claim 1, wherein several circular projections are rotatably installed on a surface of the bobbin mount to enable smooth movement of the empty first bobbin and the new second bobbin.

3. The secondary battery electrode film and separator supply device of claim 2, wherein a second pusher is configured to rotate up and down and move left and right at a front end of the guide of the bobbin mount, a circular groove is formed at an end of the second pusher to be fitted on the bobbin mount, wherein the pusher is configured to be rotated outward to not interfere with the bobbin mount when the bobbin mount rotates 180 degrees, and when the bobbin mount finishes rotating 180 degrees, the circular groove of the pusher is coupled to the guide of the bobbin mount and pushes the new second bobbin to the deliverer.

* * * * *